(12) United States Patent
Kim et al.

(10) Patent No.: US 11,737,131 B2
(45) Date of Patent: Aug. 22, 2023

(54) METHOD AND APPARATUS FOR TRANSMITTING AND RECEIVING CHANNEL STATE INFORMATION IN WIRELESS COMMUNICATION SYSTEM

(71) Applicant: LG Electronics Inc., Seoul (KR)

(72) Inventors: Kyuseok Kim, Seoul (KR); Jiwon Kang, Seoul (KR); Haewook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/984,733

(22) Filed: Nov. 10, 2022

(65) Prior Publication Data

US 2023/0081534 A1 Mar. 16, 2023

Related U.S. Application Data

(63) Continuation of application No. 17/841,294, filed on Jun. 15, 2022, which is a continuation of application
(Continued)

(30) Foreign Application Priority Data

Feb. 8, 2021 (KR) .................. 10-2021-0017332
Apr. 2, 2021 (KR) .................. 10-2021-0043315

(51) Int. Cl.
*H04W 72/542* (2023.01)
*H04L 5/00* (2006.01)
(Continued)

(52) U.S. Cl.
CPC ......... *H04W 72/542* (2023.01); *H04L 5/0051* (2013.01); *H04W 72/1273* (2013.01); *H04W 72/23* (2023.01)

(58) Field of Classification Search
CPC ............ H04W 72/1273; H04W 72/23; H04W 72/542; H04L 5/0051
(Continued)

(56) References Cited

U.S. PATENT DOCUMENTS 11,464,030 B2 * 10/2022 Kim ..................... H04L 5/0057
2020/0205150 A1 6/2020 Cheng et al.
(Continued)

OTHER PUBLICATIONS

Huawei & HiSilicon, "Summary of CSI enhancements for MTRP and FDD (Round 0)," R1-2101884, Presented at 3GPP TSG RAN WG1 Meeting #104-e, E-meeting, Jan. 25-Feb. 5, 2021, 48 pages.
(Continued)

*Primary Examiner* — Peter G Solinsky
(74) *Attorney, Agent, or Firm* — Fish & Richardson P.C.

(57) ABSTRACT

A method of transmitting channel state information (CSI) in a wireless communication system includes: receiving, from a base station, configuration information related to CSI; receiving, from the base station, a CSI-reference signal (CSI-RS) on a plurality of CSI-RS resources; and transmitting, to the base station, first CSI based on the configuration information. The plurality of CSI-RS resources corresponding to the configuration information are configured with (i) one or more channel measurement resources (CMRs) configured to be used to derive CSI based on a single CMR and (ii) one or more CMR pairs configured to be used to derive CSI based on a single CMR pair, unless there is a specific configuration by the configuration information, based on the first CSI being CSI derived based on a single CMR, any CMR included in the one or more CMR pairs may be not used to derive the first CSI.

10 Claims, 13 Drawing Sheets

Related U.S. Application Data

No. 17/667,016, filed on Feb. 8, 2022, now Pat. No. 11,464,030.

(51) Int. Cl.
 *H04W 72/1273* (2023.01)
 *H04W 72/23* (2023.01)

(58) Field of Classification Search
 USPC .......................................................... 370/329
 See application file for complete search history.

(56) References Cited

U.S. PATENT DOCUMENTS

| | | | |
|---|---|---|---|
| 2021/0028843 A1 | 1/2021 | Zhou et al. | |
| 2021/0258059 A1 | 8/2021 | Onggosanusi et al. | |
| 2021/0329473 A1 | 10/2021 | Zhang et al. | |
| 2021/0351838 A1 | 11/2021 | Zhang et al. | |
| 2022/0131587 A1 | 4/2022 | Zhou et al. | |
| 2022/0140878 A1* | 5/2022 | Zhu | H04B 7/088 370/252 |
| 2022/0263558 A1* | 8/2022 | Zhu | H04W 24/10 |

OTHER PUBLICATIONS

Office Action in Korean Appln. No. 2022-7017613, dated Oct. 18, 2022, 10 pages (with English translation).

International Search Report in International Appln. No. PCT/KR2022/001372, dated May 3, 2022, 9 pages.

Oppo, "CSI enhancements: MTRP and FR1 FDD reciprocity," R1-2100124, Presented at 3GPP TSG RAN WG1 #104e, e-Meeting, Jan. 25-Feb. 5, 2021, 12 pages.

Samsung, "Views on Rel. 17 CSI enhancements," R1-2101857, Presented at 3GPP TSG RAN WG1#104-e, e-Meeting, Jan. 25-Feb. 5, 2021, 14 pages.

ZTE, "CSI enhancements forMulti-TRP and FR1 FDD reciprocity," R1-2100291, Presented at 3GPP TSG RAN WG1 #104-e, e-Meeting, Jan. 25-Feb. 5, 2021, 15 pages.

\* cited by examiner

METHOD AND APPARATUS FOR TRANSMITTING AND RECEIVING CHANNEL STATE INFORMATION IN WIRELESS COMMUNICATION SYSTEM

CROSS-REFERENCE TO RELATED APPLICATIONS

This application is a continuation of U.S. application Ser. No. 17/841,294, filed on Jun. 15, 2022, which is a continuation of U.S. application Ser. No. 17/667,016, filed on Feb. 8, 2022, now U.S. Pat. No. 11,464,030, which claims the benefit of earlier filing date and right of priority to Korean Application Nos. 10-2021-0017332, filed on Feb. 8, 2021, and 10-2021-0043315, filed on Apr. 2, 2021, the contents of which are all hereby incorporated by reference herein in their entirety.

TECHNICAL FIELD

The present disclosure relates to a wireless communication system, and in more detail, relates to a method and an apparatus of transmitting and receiving channel state information in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus of transmitting and receiving channel state information.

An additional technical object of the present disclosure is to provide a method and an apparatus of transmitting and receiving channel state information for a channel state information reference signal (CSI-RS) transmitted from a single and/or multiple TRP (transmission reception point) by/from a terminal equipped with a plurality of panels.

The technical objects to be achieved by the present disclosure are not limited to the above-described technical objects, and other technical objects which are not described herein will be clearly understood by those skilled in the pertinent art from the following description.

A method of transmitting channel state information (CSI) in a wireless communication system according to an aspect of the present disclosure may include receiving, from a base station, configuration information related to CSI; receiving, from the base station, a CSI-reference signal (CSI-RS) on a plurality of CSI-RS resources; and transmitting, to the base station, first CSI based on the configuration information. The plurality of CSI-RS resources corresponding to the configuration information may be configured with one or more channel measurement resources (CMRs) and one or more CMR pairs, the one or more CMRs may be configured to be used to derive CSI based on a single CMR, the one or more CMR pairs may be configured to be used to derive CSI based on a single CMR pair, unless there is a specific configuration by the configuration information, based on the first CSI being CSI derived based on a single CMR, any CMR included in the one or more CMR pairs may be not used to derive the first CSI.

A method of receiving channel state information (CSI) in a wireless communication system according to an additional aspect of the present disclosure may include transmitting, to a terminal, configuration information related to CSI; transmitting, to the terminal, a CSI-reference signal (CSI-RS) on a plurality of CSI-RS resources; and receiving, from the terminal, first CSI based on the configuration information. The plurality of CSI-RS resources corresponding to the configuration information may be configured with one or more channel measurement resources (CMRs) and one or more CMR pairs, the one or more CMRs may be configured to be used to derive CSI based on a single CMR, the one or more CMR pairs may be configured to be used to derive CSI based on a single CMR pair, unless there is a specific configuration by the configuration information, based on the first CSI being CSI derived based on a single CMR, any CMR included in the one or more CMR pairs may be not used to derive the first CSI.

According to an embodiment of the present disclosure, optimal channel state information for performing single and/or multiple transmission reception point (TRP) transmission can be obtained/reported.

In addition, according to an embodiment of the present disclosure, resources for channel measurement and/or data transmission/reception from single and/or multiple TRPs can be effectively configured appropriately for an operation of a terminal equipped with multiple panels.

In addition, according to an embodiment of the present disclosure, by obtaining/reporting optimal channel state information for performing single and/or multiple TRP transmission, more suitable link adaptation can be performed and wireless communication system performance can be improved.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
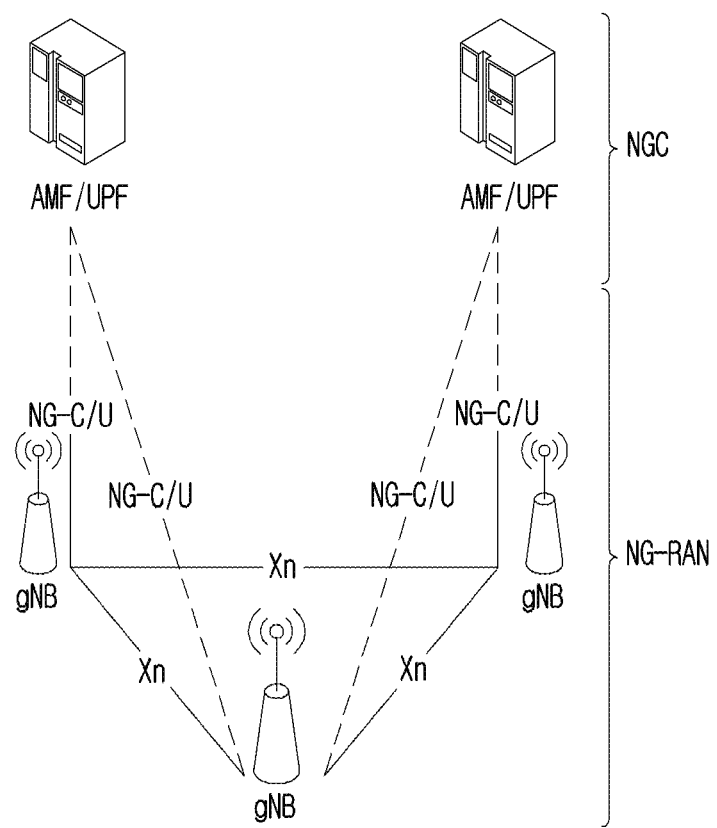
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS(Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
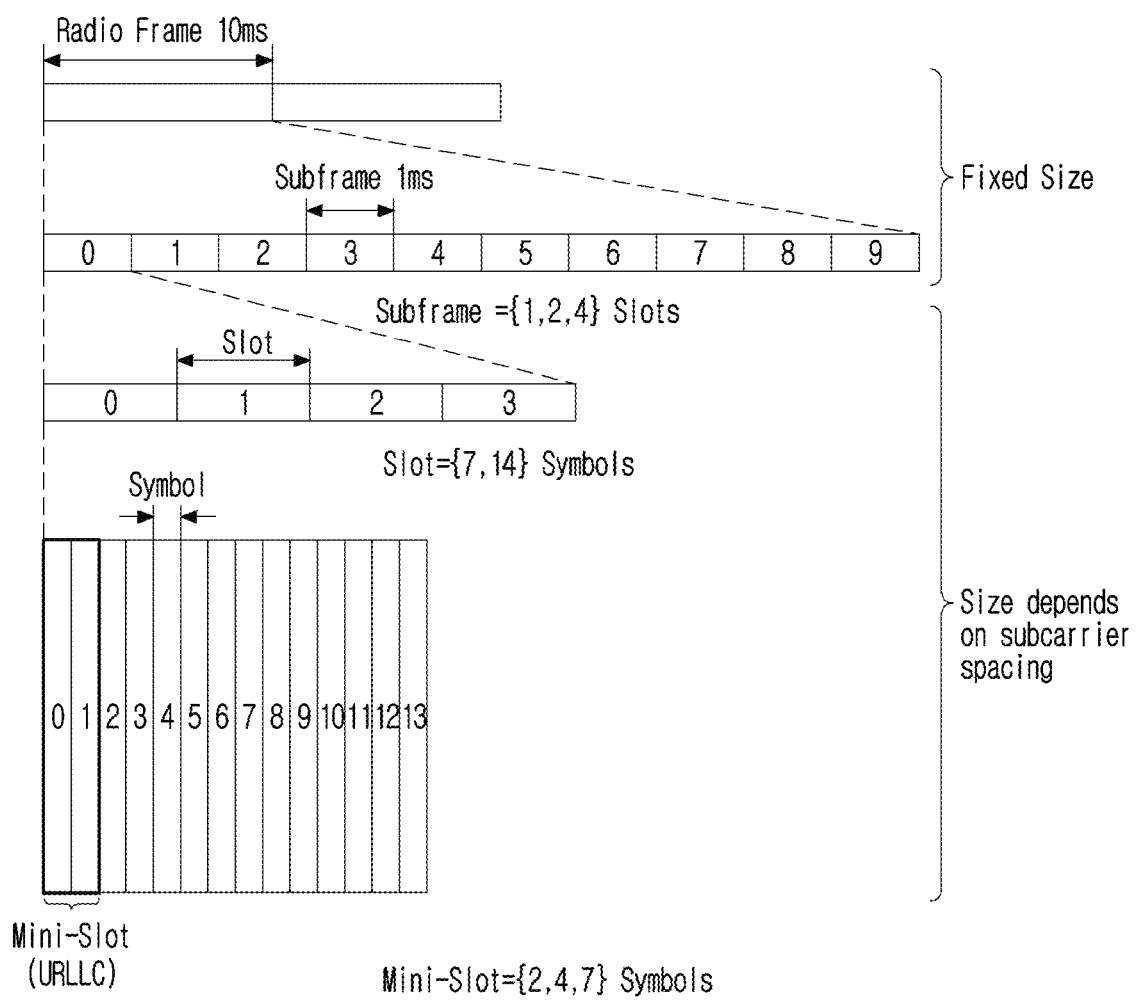
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, $\mu$). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c = 1/(\Delta f_{max} \cdot N_f)$. Here, $\Delta f_{max}$ is 480·10³ Hz and $N_f$ is 4096. Downlink and uplink transmission is configured (organized) with a radio frame having a duration of $T_f = 1/(\Delta f_{max} N_f/100) \cdot T_c = 10$ ms. Here, a radio frame is configured with 10 subframes having a duration of $T_{sf} = (\Delta f_{max} N_f/1000) \cdot T_c = 1$ ms, respectively. In this case, there may be one set of frames for an uplink and one set of frames for a downlink. In addition, transmission in an uplink frame No. i from a terminal should start earlier by $T_{TA} = (N_{TA} + N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
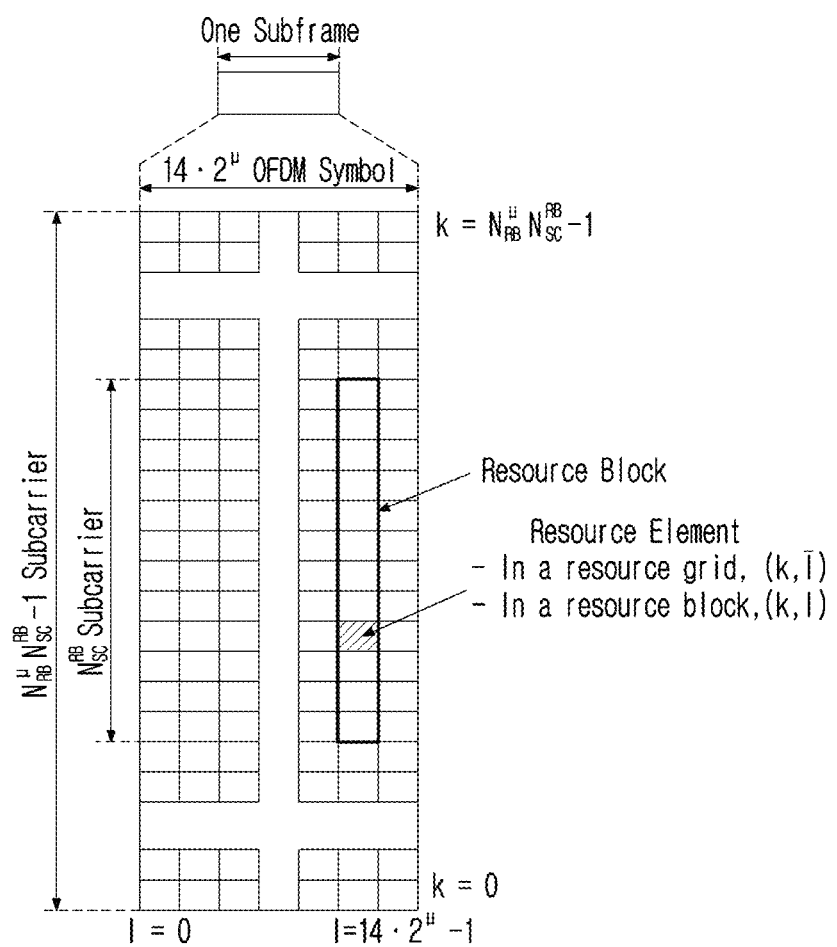
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with 14·2^μ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, ..., $N_{RB}^\mu N_{sc}^{RB}-1$ is an index in a frequency domain and l'=0, ..., $2^\mu N_{symb}^{(\mu)}-1$ refers to a position of a symbol in a subframe. When referring to a resource element in a slot, an index pair (k,l) is used. Here, l=0, ..., $N_{symb}^\mu-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l}^{(p)}$ or $a_{k,l}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^\mu$ and a resource element (k,l) for a subcarrier spacing configuration μ in a frequency domain is given as in the following Equation 1.

$$n_{CRB}^\mu = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^\mu = n_{PRB}^\mu + N_{BWP,i}^{start,\mu} \quad \text{[Equation 2]}$$

$N_{BWP,i}^{start,\mu}$ is a common resource block that a BWP starts relatively to common resource block 0.

Figure 4:
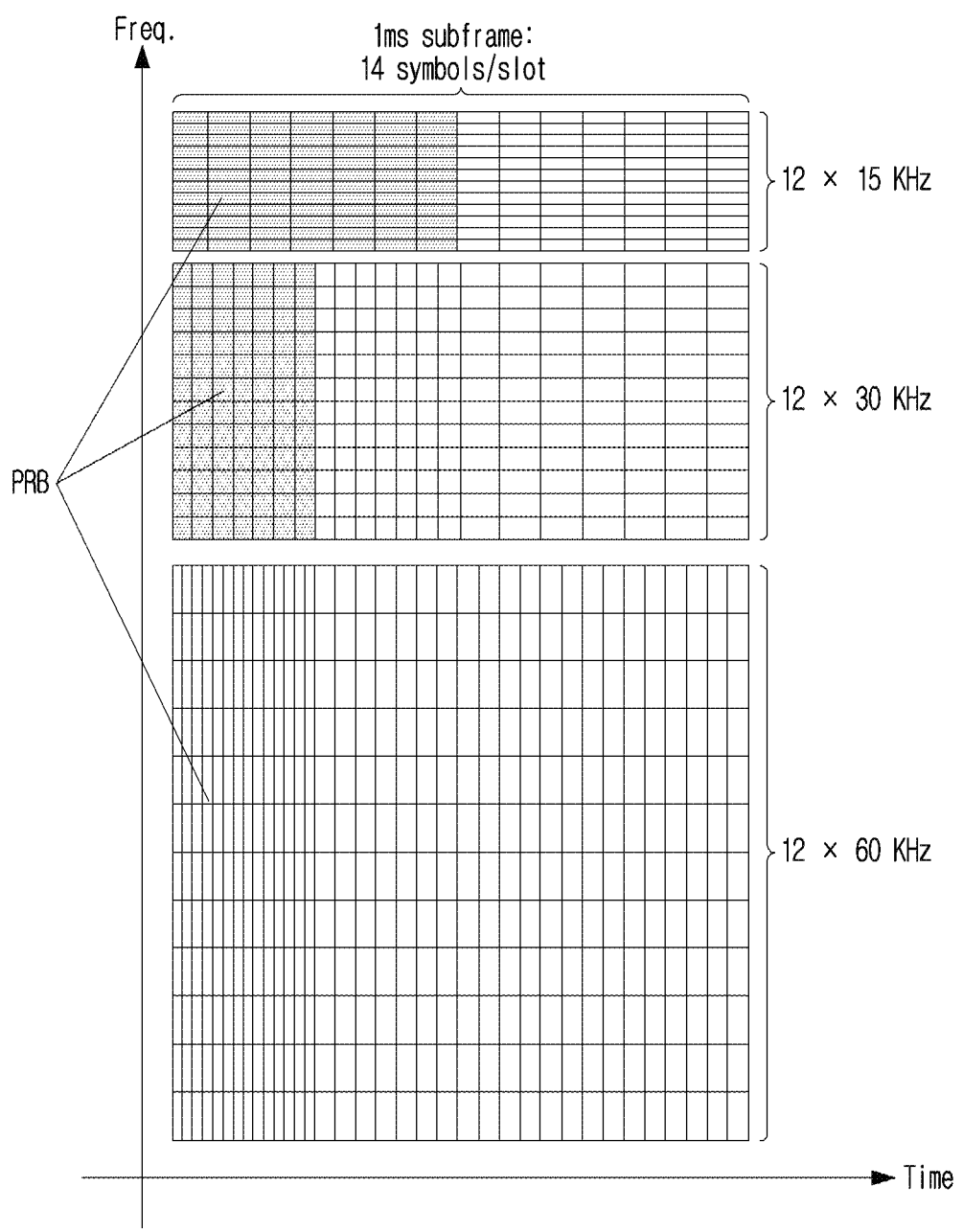
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
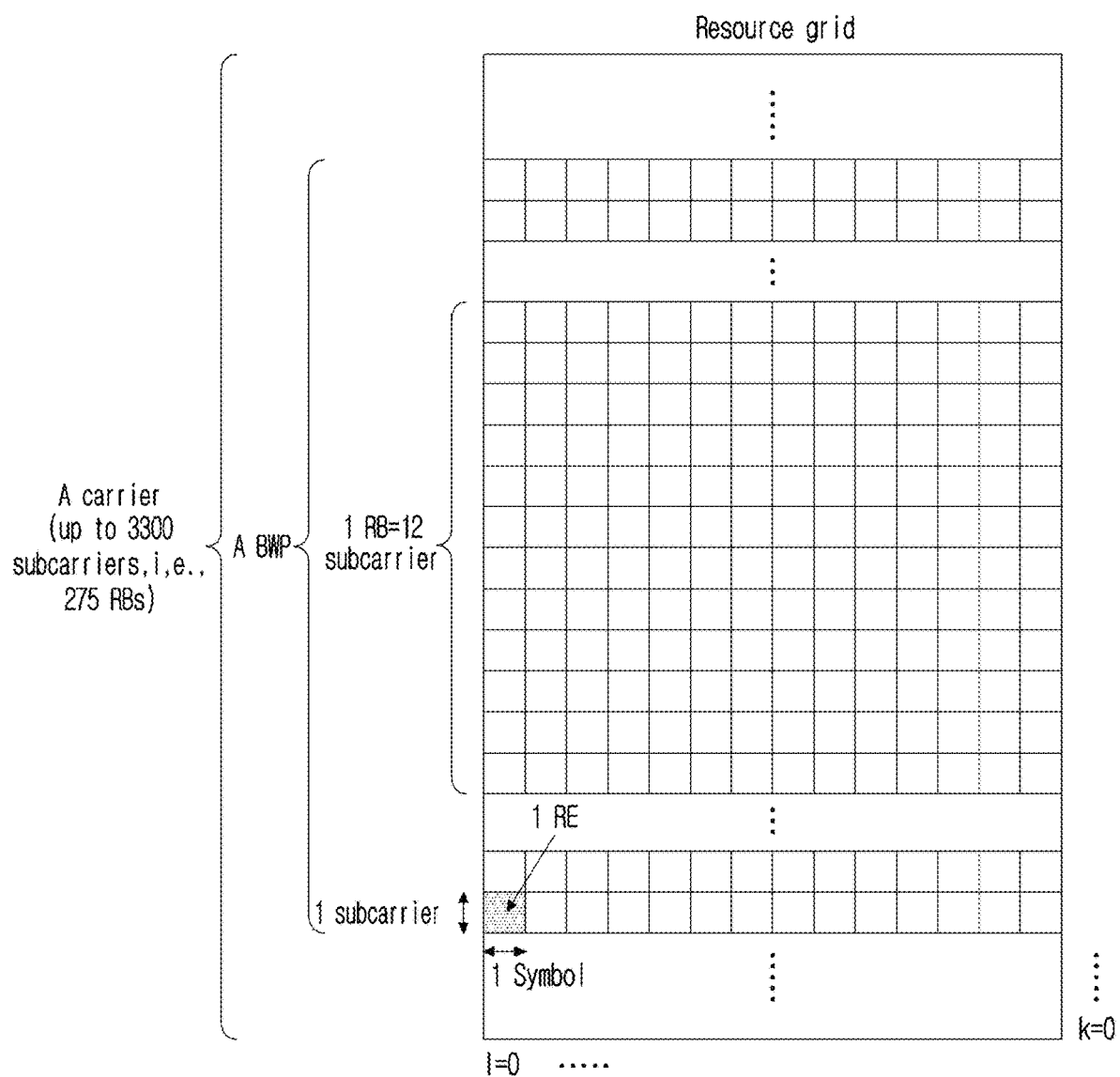
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
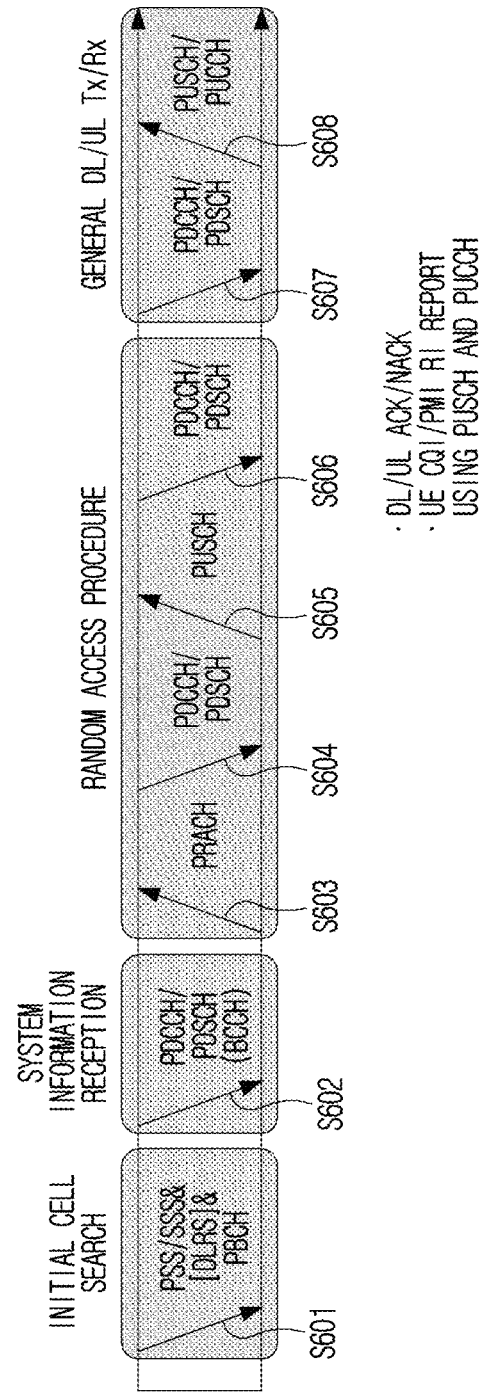
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH)

procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3 GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

CSI-Related Operation

In an NR (New Radio) system, a CSI-RS (channel state information-reference signal) is used for time and/or frequency tracking, CSI computation, L1 (layer 1)-RSRP (reference signal received power) computation and mobility. Here, CSI computation is related to CSI acquisition and L1-RSRP computation is related to beam management (BM).

CSI (channel state information) collectively refers to information which may represent quality of a radio channel (or also referred to as a link) formed between a terminal and an antenna port.

To perform one of the usages of a CSI-RS, a terminal (e.g., user equipment, UE) receives configuration information related to CSI from a base station (e.g., general Node B, gNB) through RRC (radio resource control) signaling.

The configuration information related to CSI may include at least one of information related to a CSI-IM (interference management) resource, information related to CSI measurement configuration, information related to CSI resource configuration, information related to a CSI-RS resource or information related to CSI report configuration.

i) Information related to a CSI-IM resource may include CSI-IM resource information, CSI-IM resource set information, etc. A CSI-IM resource set is identified by a CSI-IM resource set ID (identifier) and one resource set includes at least one CSI-IM resource. Each CSI-IM resource is identified by a CSI-IM resource ID.

ii) Information related to CSI resource configuration may be expressed as CSI-ResourceConfig IE. Information related to a CSI resource configuration defines a group which includes at least one of an NZP (non zero power) CSI-RS resource set, a CSI-IM resource set or a CSI-SSB resource set. In other words, the information related to a CSI resource configuration may include a CSI-RS resource set list and the CSI-RS resource set list may include at least one of a NZP CSI-RS resource set list, a CSI-IM resource set list or a CSI-SSB resource set list. A CSI-RS resource set is identified by a CSI-RS resource set ID and one resource set includes at least one CSI-RS resource. Each CSI-RS resource is identified by a CSI-RS resource ID.

Parameters representing a usage of a CSI-RS (e.g., a 'repetition' parameter related to BM, a 'trs-Info' parameter related to tracking) may be configured per NZP CSI-RS resource set.

iii) Information related to a CSI report configuration includes a report configuration type (reportConfigType) parameter representing a time domain behavior and a report quantity (reportQuantity) parameter representing CSI-related quantity for a report. The time domain behavior may be periodic, aperiodic or semi-persistent.

A terminal measures CSI based on the configuration information related to CSI.

The CSI measurement may include (1) a process in which a terminal receives a CSI-RS and (2) a process in which CSI is computed through a received CSI-RS and detailed description thereon is described after.

For a CSI-RS, RE (resource element) mapping of a CSI-RS resource in a time and frequency domain is configured by higher layer parameter CSI-RS-ResourceMapping.

A terminal reports the measured CSI to a base station.

In this case, when quantity of CSI-ReportConfig is configured as 'none (or No report)', the terminal may omit the report. But, although the quantity is configured as 'none (or No report)', the terminal may perform a report to a base station. When the quantity is configured as 'none', an aperiodic TRS is triggered or repetition is configured. In this case, only when repetition is configured as 'ON', a report of the terminal may be omitted.

CSI Measurement

An NR system supports more flexible and dynamic CSI measurement and reporting. Here, the CSI measurement may include a procedure of receiving a CSI-RS and acquiring CSI by computing a received CSI-RS.

As a time domain behavior of CSI measurement and reporting, aperiodic/semi-persistent/periodic CM (channel measurement) and IM (interference measurement) are supported. 4-port NZP CSI-RS RE pattern is used for CSI-IM configuration.

CSI-IM based IMR of NR has a design similar to CSI-IM of LTE and is configured independently from ZP CSI-RS resources for PDSCH rate matching. In addition, each port emulates an interference layer having (a desirable channel and) a precoded NZP CSI-RS in NZP CSI-RS-based IMR. As it is about intra-cell interference measurement for a multi-user case, MU interference is mainly targeted.

A base station transmits a precoded NZP CSI-RS to a terminal in each port of configured NZP CSI-RS based IMR.

A terminal assumes a channel/interference layer and measures interference for each port in a resource set.

When there is no PMI and RI feedback for a channel, a plurality of resources are configured in a set and a base station or a network indicates a subset of NZP CSI-RS resources through DCI for channel/interference measurement.

A resource setting and a resource setting configuration are described in more detail.

Resource Setting

Each CSI resource setting 'CSI-ResourceConfig' includes a configuration for a S≥1 CSI resource set (given by a higher layer parameter csi-RS-ResourceSetList). A CSI resource setting corresponds to CSI-RS-resourcesetlist. Here, S represents the number of configured CSI-RS resource sets. Here, a configuration for a S≥1 CSI resource set includes each CSI resource set including CSI-RS resources (configured with a NZP CSI-RS or CSI-IM) and a SS/PBCH block (SSB) resource used for L1-RSRP computation.

Each CSI resource setting is positioned at a DL BWP (bandwidth part) identified by a higher layer parameter bwp-id. In addition, all CSI resource settings linked to a CSI reporting setting have the same DL BWP.

A time domain behavior of a CSI-RS resource in a CSI resource setting included in a CSI-ResourceConfig IE may be indicated by a higher layer parameter resourceType and may be configured to be aperiodic, periodic or semi-persistent. For a periodic and semi-persistent CSI resource setting, the number (S) of configured CSI-RS resource sets is limited to '1'. For a periodic and semi-persistent CSI resource setting, configured periodicity and a slot offset are given by a numerology of an associated DL BWP as given by bwp-id.

When UE is configured with a plurality of CSI-ResourceConfigs including the same NZP CSI-RS resource ID, the same time domain behavior is configured for CSI-ResourceConfig.

When UE is configured with a plurality of CSI-ResourceConfigs including the same CSI-IM resource ID, the same time domain behavior is configured for CSI-ResourceConfig.

One or more CSI resource settings for channel measurement (CM) and interference measurement (IM) are configured through higher layer signaling as follows.

CSI-IM resource for interference measurement
NZP CSI-RS resource for interference measurement
NZP CSI-RS resource for channel measurement In other words, a CMR (channel measurement resource) may be a NZP CSI-RS for CSI acquisition and an IMR (Interference measurement resource) may be a NZP CSI-RS for CSI-IM and IM.

In this case, CSI-IM (or a ZP CSI-RS for IM) is mainly used for inter-cell interference measurement.

In addition, an NZP CSI-RS for IM is mainly used for intra-cell interference measurement from multi-users.

UE may assume that CSI-RS resource(s) for channel measurement and CSI-IM/NZP CSI-RS resource(s) for interference measurement configured for one CSI reporting are 'QCL-TypeD' per resource.

Resource Setting Configuration

As described, a resource setting may mean a resource set list.

For aperiodic CSI, each trigger state configured by using a higher layer parameter CSI-AperiodicTriggerState is associated with one or a plurality of CSI-ReportConfigs that each CSI-ReportConfig is linked to a periodic, semi-persistent or aperiodic resource setting.

One reporting setting may be connected to up to 3 resource settings.

When one resource setting is configured, a resource setting (given by a higher layer parameter resourcesForChannelMeasurement) is about channel measurement for L1-RSRP computation.

When two resource settings are configured, a first resource setting (given by a higher layer parameter resourcesForChannelMeasurement) is for channel measurement and a second resource setting (given by csi-IM-ResourcesForInterference or nzp-CSI-RS-ResourcesForInterference) is for interference measurement performed in CSI-IM or a NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement and a third resource setting (given by nzp-CSI-RS-ResourcesForInterference) is for NZP CSI-RS based interference measurement.

For semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, a first resource setting (given by resourcesForChannelMeasurement) is for channel measurement and a second resource setting (given by a higher layer parameter csi-IM-ResourcesForInterference) is used for interference measurement performed in CSI-IM.

CSI Computation

When interference measurement is performed in CSI-IM, each CSI-RS resource for channel measurement is associated with a CSI-IM resource per resource in an order of CSI-RS resources and CSI-IM resources in a corresponding resource set. The number of CSI-RS resources for channel measurement is the same as the number of CSI-IM resources.

In addition, when interference measurement is performed in an NZP CSI-RS, UE does not expect to be configured with one or more NZP CSI-RS resources in an associated resource set in a resource setting for channel measurement.

A terminal configured with a higher layer parameter nzp-CSI-RS-ResourcesForInterference does not expect that 18 or more NZP CSI-RS ports will be configured in a NZP CSI-RS resource set.

For CSI measurement, a terminal assumes the followings.
Each NZP CSI-RS port configured for interference measurement corresponds to an interference transmission layer.
All interference transmission layers of an NZP CSI-RS port for interference measurement consider EPRE (energy per resource element) ratio.
A different interference signal in RE(s) of an NZP CSI-RS resource for channel measurement, an NZP CSI-RS resource for interference measurement or a CSI-IM resource for interference measurement CSI Report For a CSI report, a time and frequency resource which may be used by UE are controlled by a base station.

CSI (channel state information) may include at least one of a channel quality indicator (CQI), a precoding matrix indicator (PMI), a CSI-RS resource indicator (CRI), a SS/PBCH block resource indicator (SSBRI), a layer indicator (LI), a rank indicator (RI) or L1-RSRP.

For CQI, PMI, CRI, SSBRI, LI, RI, L1-RSRP, a terminal is configured by a higher layer with N≥1 CSI-ReportConfig reporting setting, M≥1 CSI-ResourceConfig resource setting and a list of one or two trigger states (provided by aperiodicTriggerStateList and semiPersistentOnPUSCH-TriggerStateList). Each trigger state in the aperiodicTriggerStateList includes an associated CSI-ReportConfigs list which indicates a channel and optional resource set IDs for interference. In semiPersistentOnPUSCH-TriggerStateList, one associated CSI-ReportConfig is included in each trigger state.

In addition, a time domain behavior of CSI reporting supports periodic, semi-persistent, aperiodic.

i) Periodic CSI reporting is performed in a short PUCCH, a long PUCCH. Periodicity and a slot offset of periodic CSI reporting may be configured by RRC and refers to a CSI-ReportConfig IE.

ii) SP (semi-periodic) CSI reporting is performed in a short PUCCH, a long PUCCH, or a PUSCH.

For SP CSI in a short/long PUCCH, periodicity and a slot offset are configured by RRC and a CSI report is activated/deactivated by separate MAC CE/DCI.

For SP CSI in a PUSCH, periodicity of SP CSI reporting is configured by RRC, but a slot offset is not configured by RRC and SP CSI reporting is activated/deactivated by DCI (format 0_1). For SP CSI reporting in a PUSCH, a separated RNTI (SP-CSI C-RNTI) is used.

An initial CSI report timing follows a PUSCH time domain allocation value indicated by DCI and a subsequent CSI report timing follows a periodicity configured by RRC.

DCI format 0_1 may include a CSI request field and activate/deactivate a specific configured SP-CSI trigger state. SP CSI reporting has activation/deactivation equal or similar to a mechanism having data transmission in a SPS PUSCH.

iii) Aperiodic CSI reporting is performed in a PUSCH and is triggered by DCI. In this case, information related to trigger of aperiodic CSI reporting may be delivered/indicated/configured through MAC-CE.

For AP CSI having an AP CSI-RS, AP CSI-RS timing is configured by RRC and timing for AP CSI reporting is dynamically controlled by DCI.

In NR, a method of dividing and reporting CSI in a plurality of reporting instances applied to a PUCCH based CSI report in LTE (e.g., transmitted in an order of RI, WB PMI/CQI, SB PMI/CQI) is not applied. Instead, in NR, there is a limit that a specific CSI report is not configured in a short/long PUCCH and a CSI omission rule is defined. In addition, regarding AP CSI reporting timing, a PUSCH symbol/slot location is dynamically indicated by DCI. In addition, candidate slot offsets are configured by RRC. For CSI reporting, a slot offset (Y) is configured per reporting setting. For UL-SCH, a slot offset K2 is separately configured.

2 CSI latency classes (low latency class, high latency class) are defined with regard to CSI computation complexity. Low latency CSI is WB CSI which includes up to 4 ports Type-I codebooks or up to 4 ports non-PMI feedback CSI. High latency CSI refers to CSI other than low latency CSI. For a normal terminal, (Z, Z') is defined in a unit of OFDM symbols. Here, Z represents the minimum CSI processing time until a CSI report is performed after receiving aperiodic CSI triggering DCI. In addition, Z' refers to the minimum CSI processing time until a CSI report is performed after receiving a CSI-RS for a channel/interference.

Additionally, a terminal reports the number of CSI which may be calculated at the same time.

Quasi-Co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

In addition, MTRP-URLLC may mean that a M TRPs transmit the same transport block (TB) by using different layer/time/frequency. A UE configured with a MTRP-URLLC transmission scheme receives an indication on multiple TCI state(s) through DCI and may assume that data received by using a QCL RS of each TCI state are the same TB. On the other hand, MTRP-eMBB may mean that M TRPs transmit different TBs by using different layer/time/frequency. A UE configured with a MTRP-eMBB transmission scheme receives an indication on multiple TCI state(s) through DCI and may assume that data received by using a QCL RS of each TCI state are different TBs. In this regard, as UE separately classifies and uses a RNTI configured for MTRP-URLLC and a RNTI configured for MTRP-eMBB, it may decide/determine whether the corresponding M-TRP transmission is URLLC transmission or eMBB transmission. In other words, when CRC masking of DCI received by UE is performed by using a RNTI configured for MTRP-URLLC, it may correspond to URLLC transmission, and when CRC masking of DCI is performed by using a RNTI configured for MTRP-eMBB, it may correspond to eMBB transmission.

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

For example, a higher layer parameter, ControlResourceSet information element (IE), is used to configure a time/frequency control resource set (CORESET). In an example, the control resource set (CORESET) may be related to detection and reception of downlink control information. The ControlResourceSet IE may include a CORESET-related ID (e.g., controlResourceSetID)/an index of a CORESET pool for a CORESET (e.g., CORESETPoolIndex)/a time/frequency resource configuration of a CORESET/TCI information related to a CORESET, etc. In an example, an index of a CORESET pool (e.g., CORESETPoolIndex) may be configured as 0 or 1. In the description, a CORESET group may correspond to a CORESET pool and a CORESET group ID may correspond to a CORESET pool index (e.g., CORESETPoolIndex).

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figure 7A:
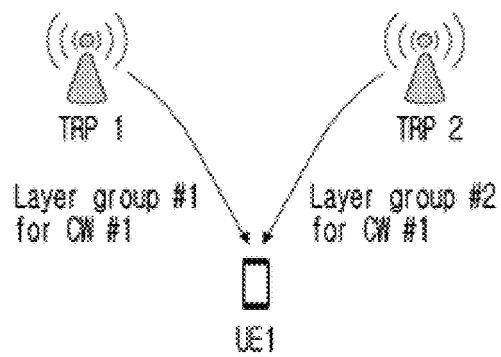
FIGS. 7A and 7B illustrate a method of multiple TRPs transmission in a wireless communication system to which the present disclosure may be applied.
Figure 7B:
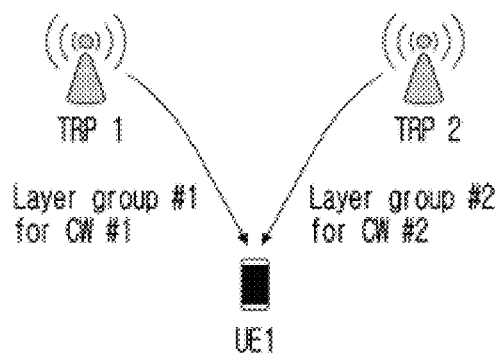

FIGS. 7A and 7B illustrate a method of multiple TRPs transmission in a wireless communication system to which the present disclosure may be applied.

In reference to FIG. 7A, it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7B, an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7B, it may have a disadvantage that a code rate corresponding to a TB is higher compared to FIG. 7A. However, it has an advantage that it may adjust a code rate by indicating a different RV (redundancy version) value or may adjust a modulation order of each CW for encoded bits generated from the same TB according to a channel environment.

According to methods illustrated in FIGS. 7A and 7B above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Multi Panel Operations

'A Panel' referred to in the present disclosure may be interpreted/applied as 'a plurality of (or at least one) panels' or 'a panel group' (having similarity/a common value with regard to a specific characteristic (e.g., timing advance (TA), a power control parameter, etc.)). Alternatively, 'a panel' referred to in the present disclosure may be interpreted/applied as 'a plurality of (or at least one) antenna ports' or 'a plurality of (or at least one) uplink resources' or 'an antenna port group' or 'an uplink resource group (or set))' (having similarity/a common value with regard to a specific characteristic (e.g., TA, a power control parameter, etc.)). Alternatively, 'a panel' referred to in the present disclosure may be interpreted/applied as 'a plurality of (or at least one) beams' or 'at least one beam group (or set)' (having similarity/a common value with regard to a specific characteristic (e.g., TA, a power control parameter, etc.)). Alternatively, 'a panel' referred to in the present disclosure may be defined as a unit for a terminal to configure a transmission/reception beam. For example, 'a transmission panel' may be defined as a unit which may generate a plurality of candidate transmission beams in one panel, but may use only one beam of them in transmission at a specific time. In other words, only one transmission beam (spatial relation information RS) may be used per Tx panel to transmit a specific uplink signal/channel. In addition, 'a panel' in the present disclosure may refer to 'a plurality of (or at least one) antenna ports' or 'an antenna port group' or 'an uplink resource group (or set))' with common/similar uplink synchronization and may be interpreted/applied as an expression which is generalized as 'an uplink synchronization unit (USU)'. In addition, 'a panel' in the present disclosure may be interpreted/applied as an expression which is generalized as 'an uplink transmission entity (UTE)'.

In addition, the 'uplink resource (or resource group)' may be interpreted/applied as a PUSCH/PUCCH/SRS/PRACH resource (or resource group (or set)). In addition, the interpretation/application may be interpreted/applied conversely. In addition, 'an antenna (or an antenna port)' may represent a physical or logical antenna (or antenna port) in the present disclosure.

In other words, 'a panel' referred to in the present disclosure may be variously interpreted as 'a terminal antenna element group', 'a terminal antenna port group', 'a terminal logical antenna group', etc. In addition, for which physical/logical antennas or antenna ports will be combined and mapped to one panel, a variety of schemes may be considered by considering a position/a distance/a correlation between antennas, a RF configuration, and/or an antenna (port) virtualization scheme, etc. Such a mapping process may be different according to terminal implementation. In addition, 'a panel' referred to in the present disclosure may be interpreted/applied as 'a plurality of panels' or 'a panel group' (having similarity with regard to a specific characteristic).

Hereinafter, multi panel structures will be described.

For terminal implementation in a high-frequency band, modeling terminal equipped with a plurality of panels (e.g., configured with one or a plurality of antennas) is considered (e.g., 2 bi-directional panels in 3GPP UE antenna modeling). A variety of forms may be considered for such implementation of a plurality of panels of a terminal. The after-described contents are based on a terminal which supports a plurality of panels, but they may be extended and applied to a base station which supports a plurality of panels (e.g., TRP). The after-described contents related to multi panel structures may be applied to transmission and reception of a signal and/or a channel considering multi panels described in the present disclosure.

Figure 8A:
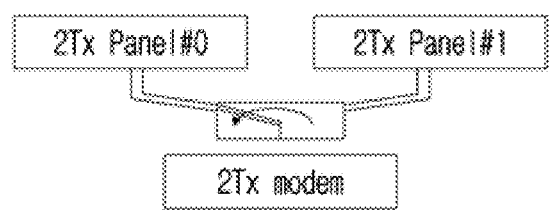
FIGS. 8A and 8B are diagrams illustrating multi panel terminals in a wireless communication system to which the present disclosure may be applied.
Figure 8B:
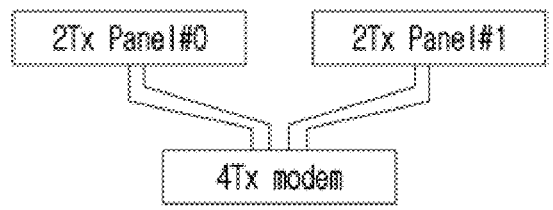

FIGS. 8A and 8B are diagrams illustrating multi panel terminals in a wireless communication system to which the present disclosure may be applied.

FIG. 8A illustrates implementation of RF (radio frequency) switch-based multi panel terminals and FIG. 8B illustrates implementation of RF connection-based multi panel terminals.

For example, it may be implemented based on RF switch as in FIG. 8A. In this case, only one panel is activated for a moment, and it may be impossible to transmit a signal for a certain duration of time to change an activated panel (i.e., panel switching).

For implementation of a plurality of panels in a different way, a RF chain may be connected respectively so that each panel can be activated anytime as in FIG. 8B. In this case, time for panel switching may be 0 or too little. And, it may be possible to simultaneously transmit a signal by activating a plurality of panels at the same time (STxMP: simultaneous transmission across multi-panel) according to a modem and power amplifier configuration.

For a terminal having a plurality of panels, a radio channel state may be different per panel, and in addition, a RF/antenna configuration may be different per panel, so a method in which a channel is estimated per panel is needed. In particular, a process in which one or a plurality of SRS resources are transmitted respectively per panel is needed to measure uplink quality or manage an uplink beam, or to measure downlink quality per panel or manage a downlink beam by utilizing channel reciprocity. Here, a plurality of SRS resources may be SRS resources which are transmitted by a different beam in one panel or may be SRS resources which are repeatedly transmitted by the same beam. Hereinafter, for convenience, a set of SRS resources transmitted in the same panel (a specific usage parameter (e.g., beam management, antenna switching, a codebook-based PUSCH, a non-codebook based PUSCH) and a specific time domain behavior (e.g., aperiodic, semi-persistent, or periodic)) may be referred to as a SRS resource group. For this SRS resource group, a SRS resource set configuration supported in a Rel-15 NR system may be utilized as it is or it may be configured separately by bundling one or a plurality of SRS resources (having the same time domain behavior and usage).

For reference, only when usage is beam management for the same usage and time domain behavior in Rel-15, a plurality of SRS resource sets may be configured. In addition, it is defined so that simultaneous transmission cannot be performed between SRS resources configured in the same SRS resource set, but simultaneous transmission can be performed between SRS resources belonging to a different SRS resource set. Accordingly, if panel implementation and simultaneous transmission of a plurality of panels as in FIG. 8B are considered, a corresponding concept (a SRS resource set) itself may be matched to a SRS resource group. But, a SRS resource group may be separately defined if even implementation (panel switching) as in FIG. 8A is considered. In an example, a configuration may be given by giving a specific ID to each SRS resource so that resources with the same ID belong to the same SRS resource group and resources with a different ID belong to a different resource group.

For example, it is assumed that 4 SRS resource sets configured for BM usage (RRC parameter usage is configured as 'BeamManagement') are configured to UE. Hereinafter, for convenience, each is referred to as SRS resource set A, B, C, D. In addition, a situation is considered which applies implementation performing SRS transmission by corresponding each of the sets to one (Tx) panel because UE implements a total of 4 (Tx) Panels.

TABLE 6

| The maximum number of SRS resource sets across all time domain behaviors (periodic/semi-persistent/aperiodic) reported in 2-30 | Additional limit to the maximum number of the maximum SRS resource sets per supported time domain behavior (periodic/semi-persistent/aperiodic) |
|---|---|
| 1 | 1 |
| 2 | 1 |
| 3 | 1 |
| 4 | 2 |
| 5 | 2 |
| 6 | 2 |
| 7 | 4 |
| 8 | 4 |

In Rel-15 standards, such UE implementation is more clearly supported by the following agreement. In other words, for UE which performs capability reporting for a value reported in feature group (FG) 2-30 as 7 or 8 in Table 6, a total of up to 4 SRS resource sets for BM (per supported time domain behavior) may be configured as in the right column of Table 6. As above, implementation which performs transmission by corresponding one UE panel to each set may be applied.

In this case, when 4 panel UE corresponds each panel to one SRS resource set for BM and transmits it, the number itself of configurable SRS resources per each set is also supported by separate UE capability signaling. For example, it is assumed that 2 SRS resources are configured in the each set. It may correspond to 'the number of UL beams' which can be transmitted per each panel. In other words, the UE may respectively correspond 2 UL beams to 2 configured SRS resources per each panel and transmit them, when 4 panels are implemented. In this situation, according to Rel-15 standards, one of a codebook (CB)-based UL or non-codebook (NCB)-based UL mode may be configured for final UL PUSCH transmission scheduling. In any case, only one SRS resource set (having usage set as "CB-based UL" or "NCB-based UL") configuration, i.e., only one dedicated SRS resource set (for a PUSCH) configuration, is supported in Rel-15 standards.

Hereinafter, multi panel UE (MPUE) categories will be described.

Regarding the above-described multi panel operations, the following 3 MPUE categories may be considered. Specifically, 3 MPUE categories may be classified according to i) whether multiple panels may be activated and/or ii) transmission using multiple panels may be possible.

MPUE category 1: In a terminal that multiple panels are implemented, only one panel may be activated at a time. A delay for panel switching/activation may be configured as [X] ms. In an example, the delay may be configured to be longer than a delay for beam switching/activation and may be configured in a unit of a symbol or in a unit of a slot. MPUE category 1 may correspond to MPUE-assumption1 described in standardization-related documents (e.g., a 3gpp agreement, a technical report (TR) document and/or a technical specification (TS) document, etc.).

MPUE category 2: In a terminal that multiple panels are implemented, multiple panels may be activated at a time. One or more panels may be used for transmission. In other words, simultaneous transmission using panels may be performed in a corresponding category. MPUE category 2 may correspond to MPUE-assumption2 described in standardization-related documents (e.g., a 3gpp agreement, a TR document and/or a TS document, etc.).

MPUE category 3: In a terminal that multiple panels are implemented, multiple panels may be activated at a time, but only one panel may be used for transmission. MPUE category 3 may correspond to MPUE-assumption3 described in standardization-related documents (e.g., a 3gpp agreement, a TR document and/or a TS document, etc.).

Regarding multi panel-based signal and/or channel transmission and reception suggested in the present disclosure, at least one of the above-described 3 MPUE categories may be supported. In an example, in Rel-16, MPUE category 3 of the following 3 MPUE categories may be (selectively) supported.

In addition, information on a MPUE category may be predefined in specifications (i.e., standards). Alternatively, information on a MPUE category may be configured semi-statically and/or may be indicated dynamically according to a system situation (i.e., a network aspect, a terminal aspect). In this case, a configuration/an indication, etc. related to multi panel-based signal and/or channel transmission and reception may be configured/indicated by considering a MPUE category.

Hereinafter, a configuration/an indication related to panel-specific transmission/reception will be described.

Regarding a multi panel-based operation, signal and/or channel transmission and reception may be performed in a panel-specific way. Here, being panel-specific may mean that signal and/or channel transmission and reception in a unit of a panel may be performed. Panel-specific transmission and reception may be referred to as panel-selective transmission and reception.

Regarding panel-specific transmission and reception in a multi panel-based operation suggested in the present disclosure, a method of using identification information (e.g., an identifier (ID), an indicator, etc.) for configuring and/or indicating a panel which will be used for transmission and reception among one or more panels may be considered.

In an example, an ID for a panel may be used for panel-selective transmission of a PUSCH, a PUCCH, a SRS, and/or a PRACH among activated multiple panels. The ID may be configured/defined based on at least any one of the following 4 methods (options (Alts) 1, 2, 3, 4).

Alt.1: An ID for a panel may be a SRS resource set ID.

In an example, it may be desirable to correspond each UE Tx panel to a SRS resource set configured with regard to terminal implementation when considering a) an aspect that SRS resources of multiple SRS resource sets having the same time domain behavior are simultaneously transmitted in the same BWP, b) an aspect that a power control parameter is configured in a unit of a SRS resource set, c) an aspect that a terminal may report as up to 4 SRS resource sets (they may correspond to up to 4 panels) according to a supported time domain behavior. In addition, an Alt.1 scheme has an advantage that a SRS resource set related to each panel may be used for 'codebook' and 'non-codebook'-based PUSCH transmission. In addition, for an Alt.1 scheme, multiple SRS resources belonging to multiple SRS resource sets may be selected by extending a SRI (SRS resource indicator) field of DCI. In addition, a mapping table of an SRI to an SRS resource may need to be extended to include SRS resources in the whole SRS resource set.

ii) Alt.2: An ID for a panel may be an ID which is (directly) associated with a reference RS resource and/or a reference RS resource set.

iii) Alt.3: An ID for a panel may be an ID which is directly associated with a target RS resource (a reference RS resource) and/or a reference RS resource set.

An Alt.3 scheme has an advantage that configured SRS resource set(s) corresponding to one UE Tx panel may be controlled more easily and that the same panel identifier may be allocated to multiple SRS resource sets having a different time domain behavior.

iv) Alt.4: An ID for a panel may be an ID which is additionally configured to spatial relation information (e.g., RRC SpatialRelationInfo).

An Alt.4 scheme may be a scheme which newly adds information for representing an ID for a panel. In this case, it has an advantage that configured SRS resource sets corresponding to one UE Tx panel may be controlled more easily and that the same panel identifier may be allocated to multiple SRS resource sets having a different time domain behavior.

In an example, a method of introducing an UL TCI similarly to the existing DL TCI (Transmission Configuration Indication) may be considered. Specifically, definition of a UL TCI state may include a list of reference RS resources (e.g., a SRS, a CSI-RS and/or an SSB). A current SRI field may be reused to select a UL TCI state from a configured set or a new DCI field of DCI format 0_1 (e.g., a UL-TCI field) may be defined for a corresponding purpose.

Information related to the above-described panel-specific transmission and reception (e.g., a panel ID, etc.) may be transmitted by higher layer signaling (e.g., a RRC message, MAC-CE, etc.) and/or lower layer signaling (e.g., layer1 (L1) signaling, DCI, etc.). Corresponding information may be transmitted from a base station to a terminal or may be transmitted from a terminal to a base station according to a situation or if necessary.

In addition, corresponding information may be configured by a hierarchical method which configures a set for a candidate group and indicates specific information.

In addition, the above-described identification information related to panel may be configured in a unit of a single panel or in a unit of multiple panels (e.g., a panel group, a panel set).

Method for Transmitting and Receiving Channel State Information

In the present disclosure, '/' may mean including all of the content separated by / (i.e., and) or including only a part of the separated content (i.e., or).

In the present disclosure, a non-coherent joint transmission (NCJT) channel measurement resource (CMR) means one of the for paired NZP-CSI-RS resources for channel measurement for calculation/derivation/reporting of NCJT CSI (i.e., M-TRP (multi-TRP) CSI). That is, a NCJT CMR means one of paired NZP-CSI-RS resources for channel measurement for calculation/derivation/reporting of NCJT CSI (i.e., M-TRP (multi-TRP) CSI) based on an NCJT measurement hypothesis.

In addition, in the present disclosure, a single TRP (STRP) CMR means an NZP-CSI-RS resource for channel measurement for calculation/derivation/reporting of STRP CSI. That is, a STRP CMR means an NZP-CSI-RS resource for channel measurement for calculation/derivation/reporting of STRP CSI based on a STRP measurement hypothesis.

This will be described with reference to the drawings below.

Figure 9A:
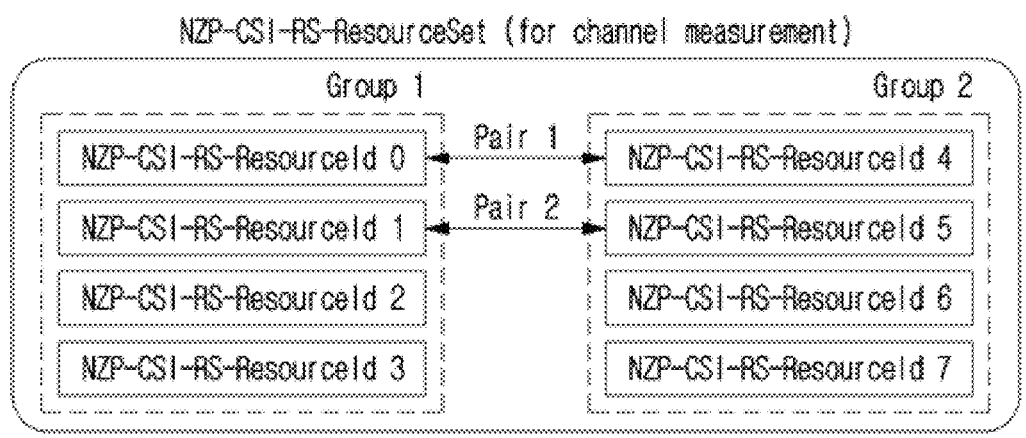
FIGS. 9A and 9B illustrate an NZP-CSI-RS resource set for channel measurement in a wireless communication system to which the present disclosure may be applied.
Figure 9B:
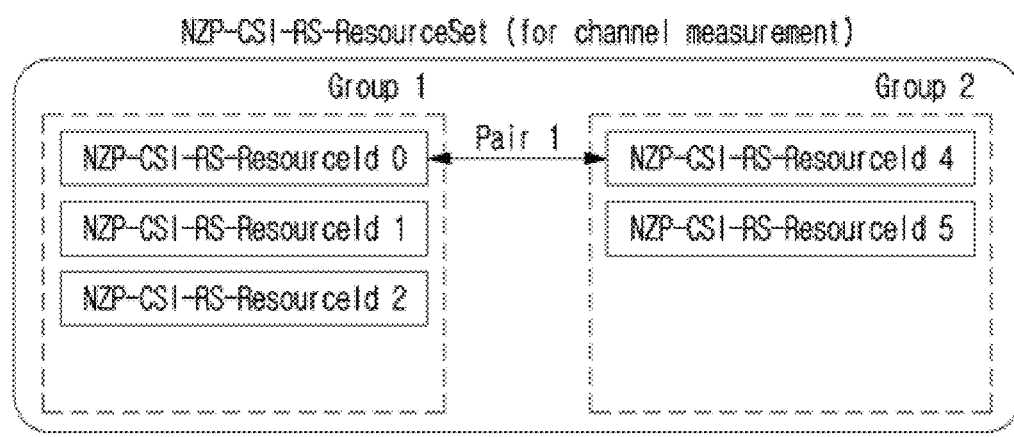

FIGS. 9A and 9B illustrate an NZP-CSI-RS resource set for channel measurement in a wireless communication system to which the present disclosure may be applied.

FIGS. 9A and 9B illustrate a configuration of an NZP-CSI-RS resource set for channel measurement. For example, an NZP-CSI-RS resource set for channel measurement may be configured by higher layer signaling (e.g., NZP-CSI-RS-ResourceSet). An NZP-CSI-RS resource set for channel measurement that a terminal uses (references) for CSI reporting may be identified/specified by higher layer configuration (e.g., CSI-ReportConfig) for CSI reporting.

For each NZP-CSI-RS resource set for channel measurement, N (N is a natural number) CMR pair(s) and 2 CMR groups may be configured. That is, one NZP-CSI-RS resource set for channel measurement may include 2 resource groups for NZP-CSI-RS resources, and NZP-CSI-RS resources included in an NZP-CSI-RS resource set may be grouped into 2 groups (i.e., group 1, group 2 in FIGS. 9A and 9B). Here, each resource group may correspond to a different TRP. In addition, the number of NZP-CSI-RS resources belonging to each resource group may be the same as shown in FIG. 9A, or may be different from each other as shown in FIG. 9B.

In addition, 2 NZP-CSI-RS resources belonging to different resource groups may be paired (pair 1, pair 2 in FIGS. 9A and 9B). That is, one NZP-CSI-RS resource belonging to group 1 and one NZP-CSI-RS resource belonging to group 2 may be configured as a resource pair.

In the present disclosure, one of resources (CMR) in a resource pair configured in the above manner may be referred to as an NCJT CMR.

FIG. 9A illustrates a case in which the NZP-CSI-RS resource corresponding to NZP-CSI-RS-ResourceId 0 and the NZP-CSI-RS resource corresponding to NZP-CSI-RS-ResourceId 4 are configured to pair 1, and the NZP-CSI-RS resource corresponding to NZP-CSI-RS-ResourceId 1 and the NZP-CSI-RS resource corresponding to NZP-CSI-RS-ResourceId 5 are configured to pair 2. In this case, each NZP-CSI-RS resource having NZP-CSI-RS-ResourceId 0, 1, 4, 5 may correspond to a NCJT CMR.

FIG. 9B illustrates a case in which the NZP-CSI-RS resource corresponding to NZP-CSI-RS-ResourceId 0 and the NZP-CSI-RS resource corresponding to NZP-CSI-RS-ResourceId 4 are configured to pair 1. In this case, each NZP-CSI-RS resource having NZP-CSI-RS-ResourceId 0, 4 may correspond to a NCJT CMR.

In addition, in the present disclosure, resources that are not paired among NZP-CSI-RS resources belonging to each group may be referred to as a STRP CMR. In FIG. 9A, each NZP-CSI-RS resource having NZP-CSI-RS-ResourceId 2, 3, 6, 7 may correspond to a STRP CMR. Similarly, in FIG. 9B, each NZP-CSI-RS resource having NZP-CSI-RS-ResourceId 1, 2, 5 may correspond to a STRP CMR.

Each resource pair configured in an NZP-CSI-RS resource set corresponds to a CRI for one MTRP, and each NZP-CSI-RS resource that does not belong to the resource pair may correspond to a CRI for one STRP. Therefore, when a terminal reports CSI for a channel with MTRP (hereinafter referred to as MTRP CSI), any one resource pair (i.e., CRI) among the configured resource pairs may be reported to a base station. In addition, when a terminal reports CSI for a channel with STRP (hereinafter, STRP CSI), any one resource (i.e., CRI) not belonging to the resource pair may be reported to a base station.

Meanwhile, in a case of a terminal equipped with a plurality of panels (i.e., multi-panel UE), when receiving an NZP CSI-RS resource for channel measurement (i.e., channel measurement resource (CMR)) and/or a PDSCH transmitted from a single TRP (STRP), a reception operation may be different depending on how many panels are used to receive the signal. In other words, depending on whether a terminal simultaneously receives a signal (e.g., CMR and/or PDSCH) through a plurality of panels (i.e., multi-panel reception), or receives a signal (e.g., CMR and/or PDSCH) through a single panel (i.e., single panel reception), that is, a reception operation may be different according to an implementation method of a terminal. For example, a terminal that prioritizes performance improvement may prefer multi-panel reception (e.g., by using two reception (Rx) beams (or spatial domain reception filters) or by using one effective reception (Rx) beam (or spatial domain reception filter)). On the other hand, a terminal that prioritizes battery saving may prefer single panel reception.

FIGS. 10A to 10D illustrate a reception method of a terminal equipped with a plurality of panels in a wireless communication system to which the present disclosure may be applied.

Figure 10A:
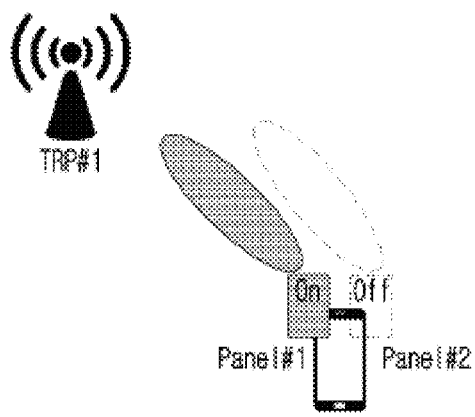
FIGS. 10A to 10D illustrate a reception method of a terminal equipped with a plurality of panels in a wireless communication system to which the present disclosure may be applied.
Figure 10B:
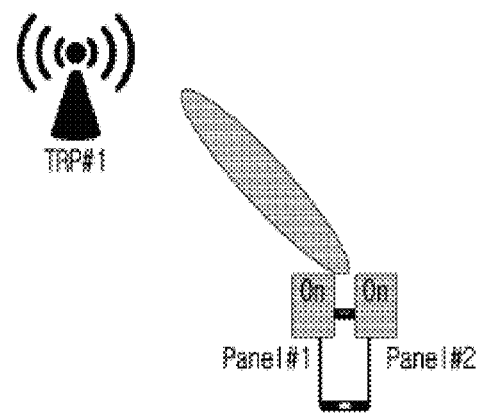
Figure 10C:
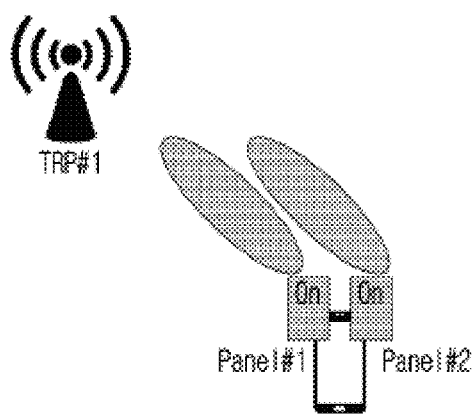
Figure 10D:
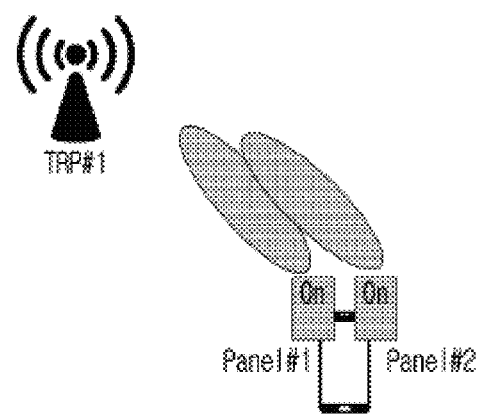

FIG. 10A illustrates a case in which a terminal equipped with a plurality of panels receives a signal based on a single panel among a plurality of panels. FIG. 10B illustrates a case in which a terminal equipped with a plurality of panels receives a signal based on a plurality of panels having a single effective beam. FIG. 10C illustrates a case in which a terminal equipped with a plurality of panels receives a signal based on a plurality of panels having the same Rx beam. FIG. 10D illustrates a case in which a terminal equipped with a plurality of panels receives a signal based on a plurality of panels having different RX beams.

As described above, in the case of a terminal equipped with a plurality of panels, the following problems may occur depending on an implementation method of a terminal.

First, when a base station intends to reuse (share) an NCJT CMR (i.e., one of the two CMRs for an NCJT measurement hypothesis) as a STRP CMR (i.e., a CMR for a STRP measurement hypothesis), if a terminal prefers multi-panel reception for a STRP CMR/STRP PDSCH, as a result, performance of the terminal may be deteriorated (e.g., low RI/CQI, etc.). For example, when a NCJT CMR is configured to be reused as a STRP CMR for a terminal, the terminal may report CSI for single panel reception for the STRP CMR (i.e., the reused (shared) NCJT CMR). In this case, the terminal may receive the actual STRP PDSCH in multi-panel, but a base station cannot perform scheduling accordingly. Therefore, scheduling may be performed lower than actual performance of the terminal, which may result in performance degradation.

Therefore, a terminal that prefers multi-panel reception for a STRP CMR/STRP PDSCH may not prefer that a base station reuse (share) an NCJT CMR as a STRP CMR. On the other hand, a terminal that prefers single panel reception for a STRP CMR/STRP PDSCH may prefer that a base station reuse (share) a NCJT CMR as a STRP CMR.

Second, a base station should configure the panel implementation applied to STRP CMR reception of a terminal to be equally applied to STRP PDSCH reception of the terminal, otherwise, performance of the terminal may be degraded as a result. For example, when a terminal receives a STRP CMR through multi-panels and a STRP PDSCH through a single panel (e.g., due to overlap with other channels), since it does not satisfy the CQI/RI reported at the time of CSI reporting when receiving the STRP PDSCH, the terminal may fail to receive the PDSCH. As another example, in a case in which a terminal receives a STRP CMR through a single panel (e.g., due to reuse (share) for NCJT CMR), and receives a STRP PDSCH in multi-panels, since a value lower than the CQI/RI that can be satisfied when receiving the actual PDSCH is reported (that is, lower reported) in CSI reporting, performance of the terminal may be deteriorated.

Hereinafter, the present disclosure proposes methods for solving problems that may occur in a terminal equipped with a plurality of panels described above.

In the present disclosure, for convenience of description, it is assumed that two TRPs (e.g., TRP1/TRP2) operate. However, this is for convenience of description, and this assumption does not limit the technical scope of the proposed methods of the present disclosure.

In the present disclosure, what has been described as TRP is for convenience of description, and TRP can also be interpreted in terms such as panel/beam.

In the present disclosure, L1 (layer 1) signaling may mean DCI-based dynamic signaling between a base station and a terminal, and L2 (layer 2) signaling is higher layer signaling based on an RRC/MAC control element (CE) between a base station and a terminal.

The present disclosure proposes a method of reporting information on a panel implementation method of a terminal to a base station and/or a method in which a base station configures/instructs information related to a panel implementation method of a terminal.

Embodiment 1: A terminal may report to a base station a 'panel assumption' used (/preferred) when receiving a STRP CMR and/or a STRP PDSCH.

Here, for example, a 'panel assumption' may include information on the number of panels used by a terminal for simultaneous reception and/or whether multi-panel reception and/or whether single panel reception.

Whether a terminal prefers to reuse (share) a NCJT CMR as a STRP CMR may be different depending on whether the terminal prefers to receive a STRP CMR and/or a STRP PDSCH in either a single panel or multi panels. That is, in this case, the 'panel assumption' may correspond to information indicating whether it is preferred (or supported) to reuse (share) a NCJT CMR as a STRP CMR.

For example, as described above, in a case of a terminal that prefers to receive a STRP CMR and/or a STRP PDSCH through a single panel, the terminal may prefer to reuse (share) a NCJT CMR as a STRP CMR. In this case, the 'panel assumption' may indicate that a terminal prefers (or supports) reuse (share) a NCJT CMR as a STRP CMR.

As another example, in a case of a terminal that prefers to receive a STRP CMR and/or a STRP PDSCH through multi panels, the terminal may not prefer to reuse (share) a NCJT CMR as a STRP CMR. In this case, the 'panel assumption' may indicate that a terminal does not prefer (or does not support) reuse (share) a NCJT CMR as a STRP CMR.

Therefore, in the present disclosure, an operation of a terminal receiving a STRP CMR and/or a STRP PDSCH through a single panel (simply referred to as single panel reception) may mean an operation that prefers (or supports) that a NCJT CMR is reused (shared) as a STRP CMR. In addition, in the present disclosure, an operation of a terminal receiving a STRP CMR and/or a STRP PDSCH through multi panels (simply referred to as multi panel reception) may mean an operation that does not prefer (or support) that a NCJT CMR is reused (shared) as a STRP CMR.

In addition, 'STRP CMR and/or STRP PDSCH' may mean a CMR and/or a PDSCH corresponding to a single TCI state and/or a single QCL assumption (N (N is a natural number, for example 2) having different QCL type(s)).

In addition, the panel assumption may be reported to a base station semi-statically and/or dynamically. For example, a terminal may report semi-statically and/or dynamically a single panel (i.e., prefer (support) reuse (share) a NCJT CMR as a STRP CMR for STRP CSI calculation/derivation/report) to a base station as the panel assumption. Alternatively, a terminal may report semi-statically and/or dynamically multi panels (i.e., does not prefer (support) reuse (share) a NCJT CMR as a STRP CMR for STRP CSI calculation/derivation/report) to a base station as the panel assumption.

For example, if it is semi-statically reported, when reporting a UE capability of a terminal, the panel assumption (e.g., the maximum number of Rx panels (for each channel/signal/resource)) may be reported together.

As another example, if it is dynamically reported, when reporting CSI of a terminal (e.g., periodic (P)/semi-persistent (SP)/aperiodic (AP) CSI report), for the CMR reported corresponding to the CSI report, the panel assumption (for example, the number (and/or identity (ID)) of panels used for simultaneous reception/whether multi-panel reception/whether single panel reception, etc.) applied when receiving the corresponding CMR may be reported together.

In addition, when a terminal reports the CSI, information on CQI/SINR/MCS margin (or differential) may be transmitted together instead of panel information. Alternatively, a terminal may transmit information on CQI/SINR/MCS margin (or differential) alone instead of panel information. By transmitting the information, a terminal can provide information that helps a base station to schedule. Here, the information on the margin (or differential) may be understood as a value corresponding to a difference between the CQI/SINR/MCS metrics, when, for example, information such as Rx panel(s) (and/or ID(s))/whether multi-panel reception/whether single panel reception/the number of Rx panels, etc. assumed in a CMR and information such as Rx panel(s) (and/or ID(s))/whether multi-panel reception/ whether single panel reception/the number of Rx panels, etc. assumed in receiving a PDSCH is different. If the corresponding value is not reported, a base station may assume that an assumption of Rx panel(s) (and/or ID(s))/whether multi-panel reception/whether single panel reception/the number of Rx panels for CMR reception of a terminal and an assumption of Rx panel(s) (and/or ID(s))/whether multi-panel reception/whether single panel reception/the number of Rx panels for PDSCH reception of the terminal is the same.

Based on the above-mentioned proposal, a terminal may report to a base station that the terminal uses/prefers multi-panel reception (i.e., a NCJT CMR is not reused (shared) as a STRP CMR) when receiving a STRP CMR and/or a STRP PDSCH (i.e., for STRP CSI calculation/derivation/report). In addition, a terminal may expect that a base station does not reuse (share) a NCJT CMR as a STRP CMR (i.e., it is expected that a STRP CMR and/or a STRP PDSCH do not overlap with other signals/channels in a time domain). And/or, a base station may perform separate signaling (i.e., specific signaling) for the assumption so that a terminal can apply the assumption (based on the report value of the terminal). That is, unless there is the specific signaling by a base station, a terminal may assume that a NCJT CMR is not reuse (share) as a STRP CMR for STRP CSI calculation/ derivation/report. In addition, according to the separate signaling, it may be defined so that a terminal performs multi-panel reception (i.e., a NCJT CMR is not reused (shared) as a STRP CMR) or single panel reception (that is, a NCJT CMR is reused (shared) as a STRP CMR) for a STRP CMR and/or a STRP PDSCH.

In other words, unless there is the specific signaling by a base station, a terminal may not reuse (share) a NCJT CMR as a STRP CMR for STRP CSI calculation/derivation/ reporting. Therefore, unless there is the specific signaling by a base station, a terminal may not use (consider) a NCJT CMR for STRP CSI calculation/derivation/report, and may use only a STRP CMR for STRP CSI calculation/derivation/ report. In addition, a STRP PDSCH may be scheduled based on a STRP CSI report. On the other hand, if a specific signaling is received from a base station, a terminal may perform single panel reception for STRP CSI calculation/ derivation/report based on the specific signaling. A UE may use (consider) not only a STRP CMR but also a NCJT CMR for STRP CSI calculation/derivation/report. That is, the specific signaling may indicate that a NCJT CMR is reused (shared) as a STRP CMR, and unless there is the specific signaling, a terminal may assume that a NCJT CMR is not reused (shared) as a STRP CMR for STRP CSI calculation/ derivation/reporting.

In addition, the specific signaling of a base station may explicitly indicate either single panel reception (i.e., a NCJT CMR is reused (shared) as a STRP CMR) or multi-panel reception (i.e., a NCJT CMR is not reused (shared) as a STRP CMR) for STRP CSI calculation/derivation/reporting.

Referring to FIG. 9A again, an NZP-CSI-RS resource set may be configured with a total of 8 NZP-CSI-RS resources, and both group 1 and 2 may be configured with 4 NZP-CSI-RS resources. NZP-CSI-RS resources 0 and 4 may be configured as pair 1, and NZP-CSI-RS resources 1 and 5 may be configured as pair 2.

Here, as described above, when there is no the specific signaling by a base station, a terminal may not use NCJT CMRs (i.e., NZP-CSI-RS resources 0, 1, 4, 5 belonging to pair 1, 2) for STRP CSI calculation/derivation/reporting, and a terminal may use only STRP CMRs (that is, NZP-CSI-RS resources 2, 3, 6, 7 that do not belong to pair 1 and 2) for STRP CSI calculation/derivation/reporting. That is, a terminal may report the most preferred one CMR (i.e., CRI) among NZP-CSI-RS resources 2, 3, 6, 7 as STRP CSI (i.e., CSI for a channel with STRP) to a base station (in addition, RI/PMI, etc. for the CMR corresponding to the CRI in STRP CSI may also be included). Meanwhile, when a terminal reports MTRP CSI (i.e., CSI for a channel with MTRP), the terminal may report the most preferred one CMR pair (i.e., CRI) among pair 1 and pair 2 to the base station (in addition, RI/PMI, etc. for a pair corresponding to the CRI in MTRP CSI may also be included).

On the other hand, as described above, when the specific signaling by a base station is received, a terminal may also use NCJT CMRs (i.e., NZP-CSI-RS resources 0, 1, 4, 5 belonging to pair 1, 2) for STRP CSI calculation/derivation/ reporting. That is, a terminal may report the most preferred one CMR (i.e., CRI) among NZP-CSI-RS resources 0, 1, 2, 3, 4, 5, 6, 7 as STRP CSI (i.e., CSI for a channel with STRP) to a base station (in addition, RI/PMI, etc. for the CMR corresponding to the CRI in STRP CSI may also be included). Meanwhile, when a terminal reports MTRP CSI (i.e., CSI for a channel with MTRP), the terminal may report the most preferred one CMR pair (i.e., CRI) among pair 1 and pair 2 to a base station (in addition, RI/PMI, etc. for a pair corresponding to the CRI in MTRP CSI may also be included).

Referring to FIG. 9B again, an NZP-CSI-RS resource set may be configured with a total of 5 NZP-CSI-RS resources, and group 1 may be configured with 3 NZP-CSI-RS resources, and group 2 may be configured with 2 NZP-CSI-RS resources. NZP-CSI-RS resources 0 and 4 may be configured as pair 1.

Here, as described above, when there is no the specific signaling by a base station, a terminal may not use NCJT CMRs (i.e., NZP-CSI-RS resources 0, 4 belonging to pair 1) for STRP CSI calculation/derivation/reporting, and a terminal may use only STRP CMRs (that is, NZP-CSI-RS resources 1, 2, 5 that do not belong to pair 1) for STRP CSI calculation/derivation/reporting. That is, a terminal may report the most preferred one CMR (i.e., CRI) among NZP-CSI-RS resources 1, 2, 5 as STRP CSI (i.e., CSI for a channel with STRP) to a base station (in addition, RI/PMI, etc. for the CMR corresponding to the CRI in STRP CSI may also be included). Meanwhile, when a terminal reports MTRP CSI (i.e., CSI for a channel with MTRP), the terminal may report MTRP CSI (e.g., RI/PMI) for pair 1 to the base station.

On the other hand, as described above, when the specific signaling by a base station is received, a terminal may also use NCJT CMRs (i.e., NZP-CSI-RS resources 0, 4 belonging to pair 1) for STRP CSI calculation/derivation/reporting. That is, a terminal may report the most preferred one CMR (i.e., CRI) among NZP-CSI-RS resources 0, 1, 2, 4, 5 as STRP CSI (i.e., CSI for a channel with STRP) to a base station (in addition, RI/PMI, etc. for the CMR corresponding to the CRI in STRP CSI may also be included). Meanwhile, when a terminal reports MTRP CSI (i.e., CSI for a channel with MTRP), the terminal may report MPRP CSI (e.g., RI/PMI) for pair 1 to a base station.

The following may be considered as an example of the specific signaling of a base station.

A base station may configure/indicate a panel assumption (e.g., the specific signaling indicating that a NCJT CMR reuses (shares) as a STRP CMR) to be applied when a terminal receives a STRP CMR and/or a STRP PDSCH (i.e., for STRP CSI calculation/derivation/report) based on L1/L2 signaling, and a terminal may perform a reception operation based on the configuration/indication of the base station.

For example, in a P/SP/AP NZP CSI-RS resource setting (configuration) and/or a P/SP/AP CSI reporting setting (configuration), a panel assumption (e.g., the number of panels used by a terminal for simultaneous reception and/or whether multi-panel reception (i.e., a NCJT CMR is not reused (shared) as a STRP CMR), and/or whether single panel reception (i.e., a NCJT CMR is reused (shared) as a STRP CMR), etc.) may be configured/indicated (respectively). For example, in a P/SP/AP CSI reporting setting (configuration), information indicating that a NCJT CMR is reused (shared) as a STRP CMR for STRP CSI calculation/derivation/reporting may be included.

When a terminal receives the resource(s) (or resource set(s)) connected to a resource setting (configuration) and/or a reporting setting (configuration) corresponding to the configuration/indication, the terminal may receive the corresponding resource(s) according to the panel assumption configured/indicated by a base station.

As an example of the signaling, when a base station indicates a single TCI state+a single panel-ID, a terminal may receive a STRP PDSCH through a single panel (that is, a NCJT CMR is reused (shared) as a STRP CMR), and when a single TCI state+two panel-IDs is indicated, a terminal may receive a STRP PDSCH through two panels (i.e., a NCJT CMR is not reused (shared) as a STRP CMR).

As an example that can utilize the signaling of a base station, a base station may configure/indicate single panel reception when reporting CSI for a STRP CMR (i.e., configure/indicate that a NCJT CMR is reused (shared) as a STRP CMR), and when scheduling a PDSCH based on the CSI value, the base station may configure/indicate multi-panel reception to a terminal while attempting a higher (aggressive) scheduling than the actual reported CSI. And/or, when scheduling higher than reported CSI is applied for a scheduled PDSCH, it may be defined that a terminal performs (automatically) multi-panel reception when receiving the PDSCH.

As described above, when a base station can directly configure/indicate a panel assumption of a terminal for each resource/signal/channel (e.g., based on UE capability, etc.), the base station may have the advantage of being able to prevent/avoid performance degradation expected for the terminal (or reduce the degree of performance degradation) while freely scheduling resources/signals/channels according to circumstances.

In addition to the above proposal, or instead of the above proposal, when reporting panel information (e.g., panel ID and/or the number of panels for simultaneous reception and/or whether multi-panel reception, etc.) on which CSI/beam measurement is performed for a specific CMR to a base station, and when the NZP CSI-RS corresponding to the specific CMR is used for another purpose, it may be defined so that the base station does not perform scheduling that cannot maintain the panel information reported by a terminal. That is, a terminal may not expect scheduling that cannot maintain the panel information reported by itself.

In addition to the above proposal, or instead of the above proposal, for a STRP CMR (i.e., a CMR for a single TRP measurement hypothesis) that is not reused as a NCJT CMR (i.e., one of two CMRs for a multi TRP measurement hypothesis), it may be defined so that a terminal (always) receive through multi-panels. In addition, this operation may be applied/configured based on L1/L2 signaling of a base station. The above operation may be applied to NOT CMR(s) and STRP CMR(s) corresponding to the same CSI report setting (configuration).

Embodiment 2: (based on the report of a terminal in Embodiment 1) A terminal may apply the same panel assumption applied in receiving a STRP CMR, when receiving a PDSCH corresponding to the STRP CMR.

In the above proposal, 'PDSCH corresponding to the STRP CMR' may mean a PDSCH corresponding to the same TCI state as a TCI state corresponding to the CMR, or may mean a PDSCH having the same specific (e.g., top, etc.) QCL resource RS(s) as a TCI state corresponding to the CMR.

In addition to the above proposal, or instead of the above proposal, the panel information corresponding to the CSI report most recently reported by a terminal (e.g., panel information applied when receiving the CMR corresponding to the CSI report) may be used equally when receiving a PSDCH. And/or, when there is no DL grant (e.g., semi-persistent scheduling, etc.), the panel information applied to the most recently transmitted SRS can be equally used when receiving a PDSCH.

Embodiment 3: When a plurality of CORESET pool indexes (CORESETPoolIndex) are configured to a terminal, the terminal may be configured/indicated/defined to operate based on a specific panel assumption when receiving a (STRP) CMR/a (STRP) PDSCH.

Here, as an example of 'a specific panel assumption', single panel reception and/or reception through a mutually exclusive panel (set) may be applied (included).

When a plurality of CORESETPoolIndex is configured to a terminal, the terminal may receive different PDSCHs in which time/frequency overlap occurs in an arbitrary slot. Here, when reception beams corresponding to each PDSCH are different, a terminal may receive each PDSCH based on different panels. Therefore, in order to prepare for the case where different PDSCHs overlap, a terminal operation may be defined so that the terminal always receives a (STRP) CMR/a (STRP) PDSCH based on a single panel. Alternatively, a terminal operation may be defined to receive each PDSCH through a mutually exclusive panel (set).

In addition to the embodiments 1 to 3, or instead of the embodiments 1 to 3, when a NCJT CMR can be reused (shared) as a STRP CMR, measurement instances may be separated. When a terminal receives a STRP CMR, it may receive the corresponding CMR based on multi-panels (or panel assumption preferred by the terminal). The following shows an example of receiving a measurement instance separately.

periodic CMR (period: 5 slots): 0th slot, 5th slot, 10th slot, 15th slot, . . .
STRP CSI report (period: 10 slots): 0th slot, 10th slot, 20th slot, . . .
STRP CSI+NCJT CSI report (period: 10 slots): 5th slot, 15th slot, 25th slot, . . .

Here, STRP CSI may be calculated based on multi-panel (or, based on panel assumption preferred by the terminal for STRP CMR) reception in 0th, 10th, and 20th slots. NCJT CSI may be calculated based on a single panel for each CMR in 5th, 15th, and 25th slots.

In order to configure/indicate the proposed method to a terminal, in addition to configuring/indicating a terminal to report STRP CSI+NCJT CSI, a base station may additionally configure/indicate whether a CSI reference resource (e.g., timing) for each CSI is configured identically or differently.

The part described as a 'single panel' in embodiments 1 to 3 may mean a panel set composed of some of the entire panels equipped in a terminal when 3 or more panels are configured/equipped in the terminal. And/or the part described as 'multi-panel' may mean the entire panel equipped in a terminal when 3 or more panels are configured/equipped in the terminal.

Although a STRP CMR and/or a STRP PDSCH has been mainly described in embodiments 1 to 3, this is for convenience of description, and the signal/resource/channel to which the proposed method is applicable is not limited thereto. That is, it is obvious that the method proposed in embodiments 1 to 3 can be extended to other signals/resources/channels (e.g., STRP PDCCH/substitute STRP with MTRP, etc.).

In embodiments 1 to 3, 'panel (ID) information' may correspond to (having a (mutual) correlation) specific DL/UL resource/channel/signal (group/set) (ID) information and/or specific DL/UL (and/or Tx/Rx) antenna port (group/set) (ID) information.

Figure 11:
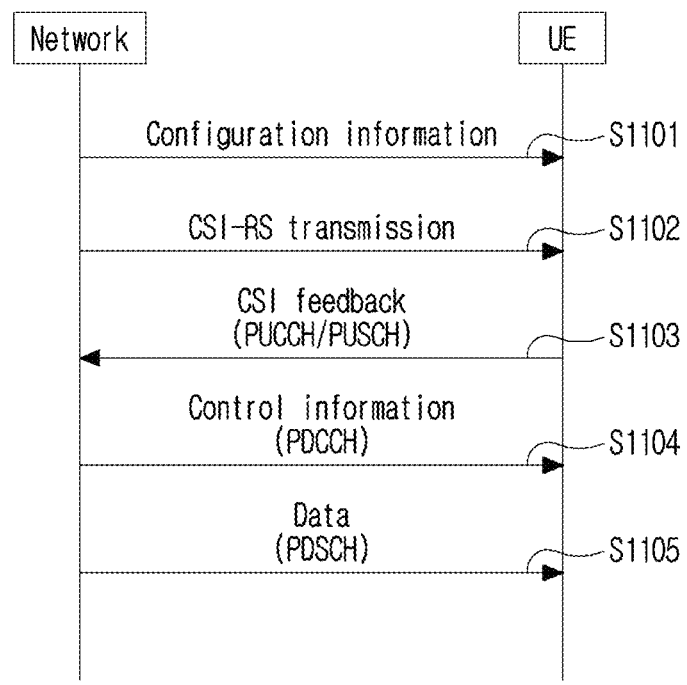
FIG. 11 is a diagram illustrating a signaling procedure between a network and a terminal for a method of transmitting and receiving channel state information according to an embodiment of the present disclosure.

FIG. 11 is a diagram illustrating a signaling procedure between a network and a terminal for a method of transmitting and receiving channel state information according to an embodiment of the present disclosure.

FIG. 11 exemplifies a signaling procedure between a network (e.g., TRP 1, TRP 2) and a terminal (i.e., UE) in a situation of multiple TRP (i.e., M-TRP, or multiple cells, hereinafter all TRP may be substituted with cells) to which the methods (e.g., any one of embodiments 1 to 3 or a combination of one or more embodiments) proposed in the present disclosure may be applied.

Figure 14:
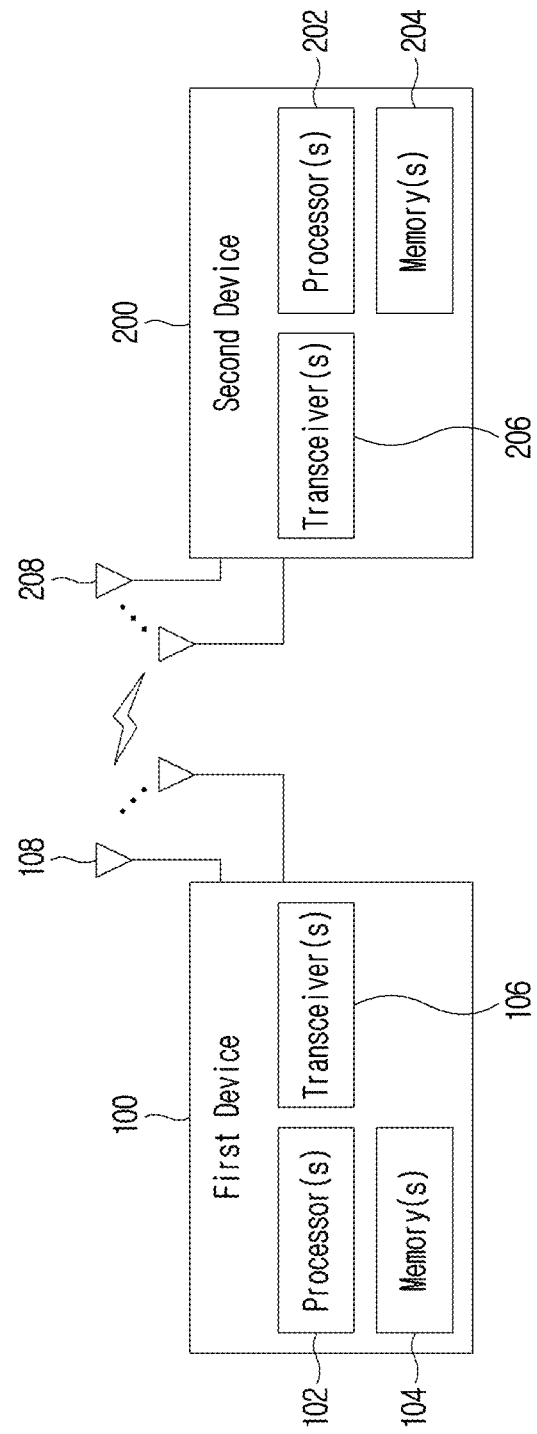
FIG. 14 is a diagram which illustrates a block diagram of a wireless communication device according to an embodiment of the present disclosure.

Here, UE/Network may be an example and may be applied by being substituted with a variety of devices as described in FIG. 14. FIG. 11 is only for convenience of description, but it is not intended to limit a scope of the present disclosure. In addition, some step(s) shown in FIG. 11 may be omitted according to a situation and/or a configuration, etc.

In the following description, a network may be one base station including a plurality of TRPs or may be one cell including a plurality of TRPs. In an example, ideal/non-ideal backhaul may be configured between TRP 1 and TRP 2 included in a network. In addition, the following description is described based on a plurality of TRPs, but it may be also equivalently extended and applied to transmission through a plurality of panels. In addition, in the present disclosure, an operation in which a terminal receives a signal from TRP1/TRP2 may be interpreted/explained (or may be an operation) as an operation in which a terminal receives a signal from a network (via/using TRP1/2), and an operation in which a terminal transmits a signal to TRP1/TRP2 may be interpreted/explained (or may be an operation) as an operation in which a terminal transmits a signal to a network (via/using TRP1/TRP2), and vice versa.

In addition, as described above, a "TRP" may be applied by being substituted with a panel, an antenna array, a cell (e.g., macro cell/small cell/pico cell, etc.), TP (transmission point), base station (base station, gNB, etc.), etc. As described above, a TRP may be classified according to information (e.g., index, identifier (ID)) on the CORESET group (or CORESET pool). As an example, when one terminal is configured to perform transmission/reception with a plurality of TRPs (or cells), this may mean that a plurality of CORESET groups (or CORESET pools) are configured for one terminal. The configuration of such a CORESET group (or CORESET pool) may be performed through higher layer signaling (e.g., RRC signaling, etc.). In addition, a base station may mean a generic term for an object that transmits and receives data with a terminal. For example, the base station may include one or more TPs (Transmission Points), one or more TRPs (Transmission and Reception Points), etc. In addition, a TP and/or a TRP may include a panel of a base station, a transmission and reception unit, etc.

Referring to FIG. 11, signaling between one network (base station) and one terminal is considered for convenience of description, but of course, the signaling method may be extended and applied to signaling between multiple TRPs and multiple terminals.

Although not shown in FIG. 11, a terminal may report, to a network, a 'panel assumption' used (preferred) when receiving a 'STRP CMR and/or STRP PDSCH'.

As described above, the 'panel assumption' may correspond to information indicating whether it is preferred (or supported) to reuse (share) a NCJT CMR as a STRP CMR.

Here, as described above, a plurality of CSI-RS resources configured for a terminal may be configured with one or more channel measurement resources (CMR) and one or more CMR pairs. Here, one or more CMRs may be configured to be used to derive CSI based on a single CMR (i.e., STRP CMR). In addition, one or more CMR pairs may be configured to be used to derive CSI based on a single pair (i.e., NCJT CMR).

For example, as described above, in a case of a terminal that prefers to receive a STRP CMR and/or a STRP PDSCH through a single panel, the terminal may prefer to reuse (share) NCJT CMR as STRP CMR. have. In this case, the 'panel assumption' may indicate that the terminal prefers (or supports) reuse (share) the NCJT CMR as the STRP CMR.

As another example, in a case of a terminal that prefers to receive a STRP CMR and/or a STRP PDSCH through multi panels, the terminal may not prefer to reuse (share) a NCJT CMR as a STRP CMR. In this case, the 'panel assumption' may indicate that the terminal does not prefer (or does not support) reuse (share) the NCJT CMR as the STRP CMR.

Referring to FIG. 11, a network transmits configuration information related to channel state information (CSI) to a terminal (S1101). That is, a terminal receives configuration information related to channel state information (CSI) from a network.

The configuration information related to the CSI may include at least one of information related to CSI-IM (interference management) resource, information related to CSI measurement configuration, information related to CSI resource configuration, information related to CSI-RS resource or information related to CSI report configuration.

In addition, the configuration information related to the CSI may include information on the above-described proposed methods (e.g., any one of embodiments 1 to 3 or a combination of one or more embodiments).

For example, the configuration information may include configuration information for a plurality of CSI-RS resources (or a CSI-RS resource set including a plurality of CSI-RS resources) through which a CSI-RS is transmitted (e.g., when the configuration information is a CSI report configuration, configuration information for a CSI-RS resource set corresponding to the CSI report configuration). Here, for example, as in the example of FIGS. 9A and 9B, a plurality of CSI-RS resources may be configured with one or more channel measurement resources (CMR) and one or more CMR pairs. Here, one or more CMRs may be configured to be used to derive CSI based on a single CMR (i.e., STRP CMR). In addition, one or more CMR pairs may be configured to be used to derive CSI based on a single pair (i.e., NCJT CMR).

In addition, as described above, the configuration information may include a specific configuration indicating that a NCJT CMR is reused (shared) as a STRP CMR (i.e., single panel reception). Therefore, unless there is a specific configuration by the configuration information, when CSI is CSI derived based on a single CMR, any CMR (i.e., NCJT CMR) included in one or more CMR pairs may not be used to derive the CSI. That is, in this way, in order to derive CSI based on a single CMR, a terminal may assume that any CMR (i.e., NCJT CMR) included in one or more CMR pairs is not used to derive the CSI. Accordingly, a terminal may derive a single CMR-based CSI using only one or more CMRs (i.e., STRP CMR).

On the other hand, when the specific configuration (i.e., indicating that a NCJT CMR is reused (shared) as a STRP CMR) is included in the configuration information, based on the specific configuration, in order to derive CSI derived based on a single CMR, one or more CMRs (i.e., STRP CMR) and CMRs (i.e., NCJT CMR) included in one or more CMR pairs may be used.

In addition, according to the specific configuration, it may be defined that a terminal performs multi-panel reception (i.e., a NCJT CMR is not reused (shared) as a STRP CMR) or single panel reception (i.e., a NCJT CMR is reused (shared) as a STRP CMR) for a STRP CMR and/or a STRP PDSCH.

A network transmits a CSI-RS on a plurality of CSI-RS resources to a terminal (S1102). That is, a terminal receives a CSI-RS from a network on a plurality of CSI-RS resources.

Here, a terminal may receive a CSI-RS on a plurality of CSI-RS resources based on the configuration information.

In addition, based on the configuration information, a terminal may receive the CSI-RS transmitted on the one or more CMRs (i.e., STRP CMR) through multi-panels (i.e., a NCJT CMR is not reused (shared) as a STRP CMR) or through a single panel (i.e., a NCJT CMR is reused (shared) as a STRP CMR).

In addition, when a control resource set (CORESET) pool index is configured to a terminal, the terminal may receive the CSI-RS on the one or more CMRs through a single panel of the terminal.

A network receives channel state information (CSI) feedback (report) from a terminal (S1103). That is, a terminal transmits channel state information (CSI) feedback (report) to a network.

Here, channel state information (CSI) feedback (report) may be transmitted through an uplink physical layer channel (e.g., PUCCH or PUSCH).

The CSI reported by a terminal to a network may be derived/generated based on the above-described proposed methods (e.g., any one of embodiments 1 to 3 or a combination of one or more embodiments).

For example, in a situation where a plurality of CSI-RS resources are configured with one or more channel measurement resources (CMR) (i.e., STRP CMR) and one or more CMR pairs, unless there is a specific configuration by the configuration information, when a terminal derives CSI (first CSI) based on a single CMR, the terminal may not use any CMR (i.e., NCJT CMR) included in one or more CMR pairs. Therefore, a terminal may derive a single CMR-based CSI (first CSI) using only one or more CMRs (i.e., STRP CMR).

In addition, when the specific configuration (i.e., indicating that a NCJT CMR is reused (shared) as a STRP CMR) is included in the configuration information, based on the specific configuration, a terminal may use one or more CMRs (i.e., STRP CMR) and CMRs included in one or more CMR pairs (i.e., NCJT CMR) to derive CSI (first CSI) based on a single CMR.

In addition, even if first CSI derived based on the one or more CMRs (i.e., STRP CMR) and second CSI derived based on the one or more CMR pairs are configured with the same reporting period, the first CSI and the second CSI may be transmitted/reported at different timings.

A network may transmit DCI for scheduling a PDSCH to a terminal (S1104). That is, a terminal may receive DCI for scheduling a PDSCH from a network.

Here, DCI may be transmitted through a physical channel (e.g., PDCCH). In addition, DCI may include scheduling information for a PDSCH.

In addition, DCI may include beam information for PDSCH transmission. For example, beam information may include at least one of a quasi co-location (QCL) source and a TCI state index.

A network may transmit downlink data to a terminal (S1105). That is, a terminal may receive downlink data from a network.

Here, downlink data may be transmitted through a physical channel (e.g., PDSCH).

In addition, as described above, when a PDSCH is configured with the same TCI state as a first TCI state corresponding to the one or more CMRs or the same QCL (quasi co-location) reference signal as a first TCI state corresponding to the one or more CMRs, a terminal may receive the PDSCH through a panel applied for reception the one or more CMRs.

Figure 12:
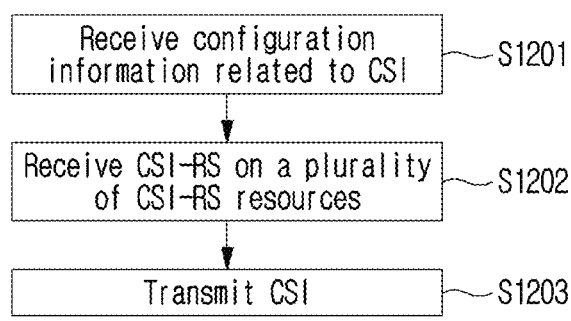
FIG. 12 is a diagram illustrating an operation of a terminal for a method of transmitting and receiving channel state information according to an embodiment of the present disclosure.

FIG. 12 is a diagram illustrating an operation of a terminal for a method of transmitting and receiving channel state information according to an embodiment of the present disclosure.

FIG. 12 exemplifies an operation of a terminal based on the above-described proposed methods (e.g., any one of embodiments 1 to 3 or a combination of one or more embodiments). FIG. 12 is only for convenience of description, but it is not intended to limit a scope of the present disclosure. Some step(s) shown in FIG. 12 may be omitted according to a situation and/or a configuration, etc. In addition, a terminal in FIG. 12 is only one example, and may be implemented as a device illustrated in FIG. 14. For example, a processor (102/202) of FIG. 14 may control to transmit and receive channel/signal/data/information, etc. (e.g., RRC signaling, MAC CE, DCI for UL/DL scheduling, SRS, PDCCH, PDSCH, PUSCH, PUCCH, PHICH, etc.) by using a transceiver (106/206), and control to store transmitted or received channel/signal/data/information in a memory (104/204).

Referring to FIG. 12, a terminal receives configuration information related to channel state information (CSI) from a base station (S1201).

The configuration information related to the CSI may include at least one of information related to CSI-IM (interference management) resource, information related to CSI measurement configuration, information related to CSI resource configuration, information related to CSI-RS resource or information related to CSI report configuration.

In addition, the configuration information related to the CSI may include information on the above-described proposed methods (e.g., any one of embodiments 1 to 3 or a combination of one or more embodiments).

For example, the configuration information may include configuration information for a plurality of CSI-RS resources (or a CSI-RS resource set including a plurality of CSI-RS resources) through which a CSI-RS is transmitted (e.g., when the configuration information is a CSI report configuration, configuration information for a CSI-RS resource set corresponding to the CSI report configuration). Here, for example, as in the example of FIGS. 9A and 9B, a plurality of CSI-RS resources may be configured with one or more channel measurement resources (CMR) and one or more CMR pairs. Here, one or more CMRs may be configured to be used to derive CSI based on a single CMR (i.e., STRP CMR). In addition, one or more CMR pairs may be configured to be used to derive CSI based on a single pair (i.e., NCJT CMR).

In addition, as described above, the configuration information may include a specific configuration indicating that a NCJT CMR is reused (shared) as a STRP CMR (i.e., single panel reception). Therefore, unless there is a specific configuration by the configuration information, when CSI is CSI derived based on a single CMR, any CMR (i.e., NCJT CMR) included in one or more CMR pairs may not be used to derive the CSI. That is, in this way, in order to derive CSI based on a single CMR, a terminal may assume that any CMR (i.e., NCJT CMR) included in one or more CMR pairs is not used to derive the CSI. Accordingly, a terminal may derive a single CMR-based CSI using only one or more CMRs (i.e., STRP CMR).

On the other hand, when the specific configuration (i.e., indicating that a NCJT CMR is reused (shared) as a STRP CMR) is included in the configuration information, based on the specific configuration, in order to derive CSI derived based on a single CMR, one or more CMRs (i.e., STRP CMR) and CMRs (i.e., NCJT CMR) included in one or more CMR pairs may be used.

In addition, according to the specific configuration, it may be defined that a terminal performs multi-panel reception (i.e., a NCJT CMR is not reused (shared) as a STRP CMR) or single panel reception (i.e., a NCJT CMR is reused (shared) as a STRP CMR) for a STRP CMR and/or a STRP PDSCH.

A terminal receives a CSI-RS from a base station on a plurality of CSI-RS resources (S1202).

Here, a terminal may receive a CSI-RS on a plurality of CSI-RS resources based on the configuration information.

In addition, based on the configuration information, a terminal may receive the CSI-RS transmitted on the one or more CMRs (i.e., STRP CMR) through multi-panels (i.e., a NCJT CMR is not reused (shared) as a STRP CMR) or through a single panel (i.e., a NCJT CMR is reused (shared) as a STRP CMR).

In addition, when a control resource set (CORESET) pool index is configured to a terminal, the terminal may receive the CSI-RS on the one or more CMRs through a single panel of the terminal.

A terminal transmits channel state information (CSI) to a base station based on configuration information (S1203).

Here, channel state information (CSI) feedback (report) may be transmitted through an uplink physical layer channel (e.g., PUCCH or PUSCH).

The CSI reported by a terminal to a base station may be derived/generated based on the above-described proposed methods (e.g., any one of embodiments 1 to 3 or a combination of one or more embodiments).

For example, in a situation where a plurality of CSI-RS resources are configured with one or more channel measurement resources (CMR) (i.e., STRP CMR) and one or more CMR pairs, unless there is a specific configuration (i.e., indicating that a NCJT CMR is reused (shared) as a STRP CMR) by the configuration information, a terminal may not use any CMR (i.e., NCJT CMR) included in one or more CMR pairs to derive CSI (first CSI) based on a single CMR. Therefore, a terminal may derive a single CMR-based CSI (first CSI) using only one or more CMRs (i.e., STRP CMR).

In addition, when the specific configuration (i.e., indicating that a NCJT CMR is reused (shared) as a STRP CMR) is included in the configuration information, based on the specific configuration, a terminal may use one or more CMRs (i.e., STRP CMR) and CMRs included in one or more CMR pairs (i.e., NCJT CMR) to derive CSI (first CSI) based on a single CMR.

In addition, even if first CSI derived based on the one or more CMRs (i.e., STRP CMR) and second CSI derived based on the one or more CMR pairs are configured with the same reporting period, the first CSI and the second CSI may be transmitted/reported at different timings.

FIG. 12 is a diagram illustrating an operation of a base station for a method of transmitting and receiving channel state information according to an embodiment of the present disclosure.

Figure 13:
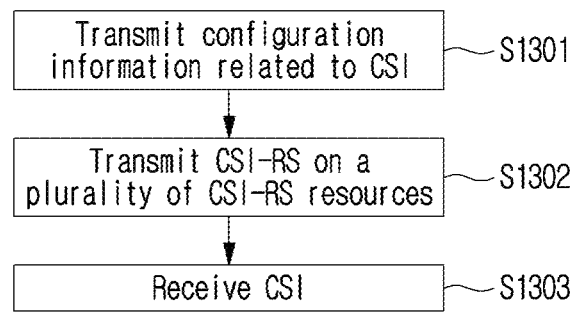
FIG. 13 is a diagram illustrating an operation of a base station for a method of transmitting and receiving channel state information according to an embodiment of the present disclosure.

FIG. 13 exemplifies an operation of a base station based on the above-described proposed methods (e.g., any one of embodiments 1 to 3 or a combination of one or more embodiments).

FIG. 13 is only for convenience of description, but it is not intended to limit a scope of the present disclosure. Some step(s) shown in FIG. 13 may be omitted according to a situation and/or a configuration, etc. In addition, a base station in FIG. 13 is only one example, and may be implemented as a device illustrated in FIG. 14. For example, a processor (102/202) of FIG. 14 may control to transmit and receive channel/signal/data/information, etc. (e.g., RRC signaling, MAC CE, DCI for UL/DL scheduling, SRS, PDCCH, PDSCH, PUSCH, PUCCH, PHICH, etc.) by using a transceiver (106/206), and control to store transmitted or received channel/signal/data/information in a memory (104/204).

Referring to FIG. 13, a base station transmits configuration information related to channel state information (CSI) to a terminal (S1301).

The configuration information related to the CSI may include at least one of information related to CSI-IM (interference management) resource, information related to CSI measurement configuration, information related to CSI resource configuration, information related to CSI-RS resource or information related to CSI report configuration.

In addition, the configuration information related to the CSI may include information on the above-described proposed methods (e.g., any one of embodiments 1 to 3 or a combination of one or more embodiments).

For example, the configuration information may include configuration information for a plurality of CSI-RS resources (or a CSI-RS resource set including a plurality of CSI-RS resources) through which a CSI-RS is transmitted (e.g., when the configuration information is a CSI report configuration, configuration information for a CSI-RS resource set corresponding to the CSI report configuration).

Here, for example, as in the example of FIGS. 9A and 9B, a plurality of CSI-RS resources may be configured with one or more channel measurement resources (CMR) and one or more CMR pairs. Here, one or more CMRs may be configured to be used to derive CSI based on a single CMR (i.e., STRP CMR). In addition, one or more CMR pairs may be configured to be used to derive CSI based on a single pair (i.e., NCJT CMR).

In addition, as described above, the configuration information may include a specific configuration indicating that a NCJT CMR is reused (shared) as a STRP CMR (i.e., single panel reception). Therefore, unless there is a specific configuration by the configuration information, when CSI is CSI derived based on a single CMR, any CMR (i.e., NCJT CMR) included in one or more CMR pairs may not be used to derive the CSI. That is, in this way, in order to derive CSI based on a single CMR, a terminal may assume that any CMR (i.e., NCJT CMR) included in one or more CMR pairs is not used to derive the CSI. Accordingly, a terminal may derive a single CMR-based CSI using only one or more CMRs (i.e., STRP CMR).

On the other hand, when the specific configuration (i.e., indicating that a NCJT CMR is reused (shared) as a STRP CMR) is included in the configuration information, based on the specific configuration, in order to derive CSI derived based on a single CMR, one or more CMRs (i.e., STRP CMR) and CMRs (i.e., NCJT CMR) included in one or more CMR pairs may be used.

In addition, according to the specific configuration, it may be defined that a terminal performs multi-panel reception (i.e., a NCJT CMR is not reused (shared) as a STRP CMR) or single panel reception (i.e., a NCJT CMR is reused (shared) as a STRP CMR) for a STRP CMR and/or a STRP PDSCH.

A base station transmits a CSI-RS to a terminal on a plurality of CSI-RS resources (S1302).

Here, a base station may transmit a CSI-RS on a plurality of CSI-RS resources based on the configuration information.

A base station receives channel state information (CSI) from a terminal based on configuration information (S1303).

Here, channel state information (CSI) feedback (report) may be transmitted through an uplink physical layer channel (e.g., PUCCH or PUSCH).

The CSI reported by a terminal to a base station may be derived/generated based on the above-described proposed methods (e.g., any one of embodiments 1 to 3 or a combination of one or more embodiments).

For example, in a situation where a plurality of CSI-RS resources are configured with one or more channel measurement resources (CMR) (i.e., STRP CMR) and one or more CMR pairs, unless there is a specific configuration (i.e., indicating that a NCJT CMR is reused (shared) as a STRP CMR) by the configuration information, any CMR (i.e., NCJT CMR) included in one or more CMR pairs may be not used to derive CSI (first CSI) based on a single CMR. Therefore, a single CMR-based CSI (first CSI) using only one or more CMRs (i.e., STRP CMR) may be derived.

In addition, when the specific configuration (i.e., indicating that a NCJT CMR is reused (shared) as a STRP CMR) is included in the configuration information, based on the specific configuration, one or more CMRs (i.e., STRP CMR) and CMRs included in one or more CMR pairs (i.e., NCJT CMR) may be used to derive CSI (first CSI) based on a single CMR.

In addition, even if first CSI derived based on the one or more CMRs (i.e., STRP CMR) and second CSI derived based on the one or more CMR pairs are configured with the same reporting period, the first CSI and the second CSI may be transmitted/reported at different timings.

General Device to which the Present Disclosure May be Applied

FIG. 14 is a diagram which illustrates a block diagram of a wireless communication device according to an embodiment of the present disclosure.

In reference to FIG. 14, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method of transmitting channel state information (CSI) in a wireless communication system, the method performed by a terminal comprising:
   receiving, from a base station, configuration information related to CSI reporting;
   receiving, from the base station, a CSI-reference signal (CSI-RS) on a CSI-RS resource set for channel measurement; and
   transmitting, to the base station, CSI generated using the CSI-RS,
   wherein the CSI-RS resource set is configured with K (K is a natural number greater than or equal to 2) resources and N (N is a natural number) resource pairs,
   wherein the N resource pairs are associated to N CRIs, respectively,
   wherein one or more resources in the K resources are associated to one or more CRIs other than the N CRIs, respectively,
   wherein unless there is a specific configuration in the configuration information, based on the CSI being derived based on a single resource, only resources that are not referred to in the N resource pairs are associated to the one or more CRIs other than the N CRIs.

2. The method of claim 1, wherein, based on the specific configuration, the K resources including resources referred to in the N resource pairs are associated to the one or more CRIs other than the N CRIs.

3. The method of claim 1, further including:
   transmitting, to the base station, information on whether to prefer a use of resources included in the N resource pairs to derive the CSI.

4. The method of claim 1, wherein the CSI-RS received on the K resources is received through a plurality of panels of the terminal.

5. The method of claim 1, further comprising:
   receiving, from the base station, downlink control information (DCI) for scheduling a physical downlink shared channel (PDSCH); and
   receiving, from the base station, the PDSCH based on the DCI,
   wherein, based on the PDSCH is configured with a transmission configuration indication (TCI) state identical to a first TCI state corresponding to the K resources or a quasi co-location (QCL) reference signal identical to the first TCI state, the PDSCH is received through a panel applied when the K resources are received.

6. The method of claim 1, wherein, based on a control resource set (CORESET) pool index being configured to the terminal, the CSI-RS received on the K CMRs is received through a single panel of the terminal.

7. A terminal for transmitting channel state information (CSI) in a wireless communication system, the terminal comprising:
   at least one transceiver for transmitting and receiving a wireless signal; and
   at least one processor for controlling the at least one transceiver,
   wherein the at least one processor configured to:
   receive, from a base station, configuration information related to CSI reporting;

receive, from the base station, a CSI-reference signal (CSI-RS) on a CSI-RS resource set for channel measurement; and transmit, to the base station, CSI generated using the CSI-RS, wherein the CSI-RS resource set is configured with measurement (K is a natural number greater than or equal to 2) resources and N (N is a natural number) resource pairs, wherein the N resource pairs are associated to N CRIs, respectively, wherein one or more resources in the K resources are associated to one or more CRIs other than the N CRIs, respectively, wherein unless there is a specific configuration in the configuration information, based on the CSI being derived based on a single resource, only resources that are not referred to in the N resource pairs are associated to the one or more CRIs other than the N CRIs.

8. A base station for receiving channel state information (CSI) in a wireless communication system, the base station comprising:

at least one transceiver for transmitting and receiving a wireless signal; and at least one processor for controlling the at least one transceiver, wherein the at least one processor configured to:

transmit, to a terminal, configuration information related to CSI reporting;

transmit, to the terminal, a CSI-reference signal (CSI-RS) on a CSI-RS resource set for channel measurement; and receive, from the terminal, CSI generated using the CSI-RS, wherein the CSI-RS resource set is configured with K (K is a natural number greater than or equal to 2) resources and N (N is a natural number) resource pairs, wherein the N resource pairs are associated to N CRIs, respectively, wherein one or more resources in the K resources are associated to one or more CRIs other than the N CRIs, respectively, wherein unless there is a specific configuration in the configuration information, based on the CSI being derived based on a single resource, only resources that are not referred to in the N resource pairs are associated to the one or more CRIs other than the N CRIs.

9. The base station of claim 8, wherein, based on the specific configuration, the K resources including resources referred to in the N resource pairs are associated to the one or more CRIs other than the N CRIs.

10. The base station of claim 9, the at least one processor further configured to:

receive, from the terminal, information on whether to prefer a use of resources included in the N resource pairs to derive the CSI.

* * * * *